United States Patent
Kang et al.

(10) Patent No.: US 10,033,491 B2
(45) Date of Patent: Jul. 24, 2018

(54) DATA TRANSMISSION DEVICE FOR HUMAN BODY COMMUNICATION, PREAMBLE GENERATION METHOD THEREOF, AND FRAME SYNCHRONIZATION METHOD THEREOF

(71) Applicant: ELECTRONICS AND TELECOMMUNICATIONS RESEARCH INSTITUTE, Daejeon (KR)

(72) Inventors: Tae Wook Kang, Daejeon (KR); Sung Weon Kang, Daejeon (KR); Hyung-Il Park, Daejeon (KR); Sung Eun Kim, Daejeon (KR); Jung Bum Kim, Daejeon (KR); Kyung Hwan Park, Daejeon (KR); Kwang Il Oh, Daejeon (KR); In Gi Lim, Daejeon (KR); Byounggun Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 55 days.

(21) Appl. No.: 15/349,214

(22) Filed: Nov. 11, 2016

(65) Prior Publication Data
US 2017/0149599 A1    May 25, 2017

(30) Foreign Application Priority Data

Nov. 25, 2015 (KR) .................. 10-2015-0165502
May 31, 2016 (KR) .................. 10-2016-0067662

(51) Int. Cl.
H04W 84/12    (2009.01)
H04L 1/20     (2006.01)
(Continued)

(52) U.S. Cl.
CPC ............... *H04L 1/203* (2013.01); *H04B 1/69* (2013.01); *H04B 13/005* (2013.01); *H04J 11/00* (2013.01)

(58) Field of Classification Search
CPC ....... H04L 27/26; H04L 1/20; H04L 27/2692; H04L 1/203; H04W 80/04; H04W 84/12
See application file for complete search history.

(56) References Cited

U.S. PATENT DOCUMENTS 7,430,193 B2   9/2008 Kim et al.
8,798,049 B2   8/2014 Lim et al.
(Continued)

FOREIGN PATENT DOCUMENTS

| KR | 10-0912543 B1 | 8/2009 |
| KR | 10-1309616 B1 | 9/2013 |
| KR | 10-1317177 B1 | 10/2013 |

*Primary Examiner* — Andrew Lee

(57) ABSTRACT

Provided is a method for generating a preamble of a transmission signal for human body communication, the method including using a frequency shift code (FSC) of which a length is adjusted according to an operating clock frequency or a transmission rate and a first pseudo random binary sequence (PRBS) code of p chips where p is a natural number to generate a first preamble unit block of n chips where n is a natural number, using the FSC and a second PRBS code of p' chips to generate a second preamble unit block of n' chips, and arraying the first preamble unit block consecutively and repeatedly and disposing the second preamble unit block at a next stage to form the preamble of the transmission signal.

20 Claims, 17 Drawing Sheets

(51) Int. Cl.
  *H04B 13/00*   (2006.01)
  *H04B 1/69*    (2011.01)
  *H04J 11/00*   (2006.01)

(56) References Cited

U.S. PATENT DOCUMENTS

| | | | |
|---|---|---|---|
| 2002/0122468 A1* | 9/2002 | Belkerdid | H04B 1/707 |
| | | | 375/146 |
| 2009/0180524 A1* | 7/2009 | Wang | H04B 1/7085 |
| | | | 375/149 |
| 2010/0310009 A1* | 12/2010 | Lakkis | H04J 13/0014 |
| | | | 375/308 |
| 2014/0369321 A1* | 12/2014 | Tan | H04W 56/001 |
| | | | 370/336 |
| 2015/0063322 A1* | 3/2015 | Haapola | H04W 72/0446 |
| | | | 370/336 |
| 2015/0289292 A1* | 10/2015 | Sun | H04W 74/0833 |
| | | | 370/329 |
| 2015/0319028 A1* | 11/2015 | Razmtouz | H04J 13/0059 |
| | | | 398/67 |
| 2016/0173303 A1* | 6/2016 | Sai | H04L 27/16 |
| | | | 375/323 |

\* cited by examiner

--- preamble transmission signal without using filter
——— preamble reception signal passing through filter

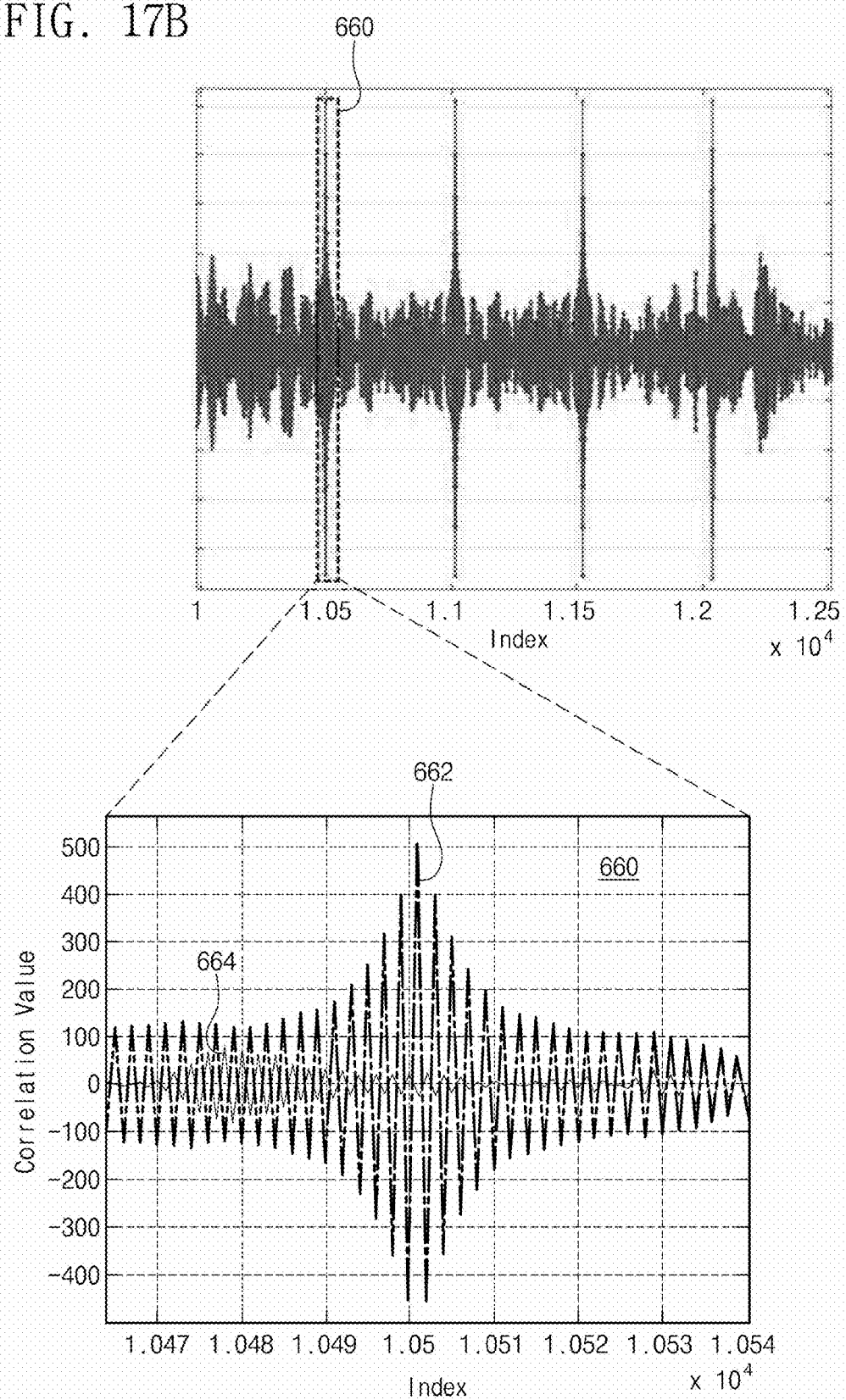

DATA TRANSMISSION DEVICE FOR HUMAN BODY COMMUNICATION, PREAMBLE GENERATION METHOD THEREOF, AND FRAME SYNCHRONIZATION METHOD THEREOF

CROSS-REFERENCE TO RELATED APPLICATIONS

This U.S. non-provisional patent application claims priority under 35 U.S.C. § 119 of Korean Patent Application Nos. 10-2015-0165502, filed on Nov. 25, 2015, and 10-2016-0067662, filed on May 31, 2016, the entire contents of which are hereby incorporated by reference.

BACKGROUND

The present disclosure herein relates to an electronic device, and more particularly, to a data transmission/reception device for human body communication, a preamble generation method thereof, and a frame synchronization method thereof.

Human body communication uses a human body having conductivity as a communication channel. Data is transmitted using a transmitter connected to a portion of a human body or being outside the human body. The data transmitted through the human body as a medium is recovered using a receiver connected to another portion of a human body or being outside the human body. When human body communication is used, communication between mobile devices or communication between a fixed device and a user may be performed through a contact of a user. For example, communications between a mobile device, such as a digital camera or a smartphone, and a peripheral electronic device may be performed through a contact of a user. Printing, credit card payment, TV reception, entrance control system, or transportation fee payment at the time of riding, etc. may be performed through a contact of a user. In addition, communication with electronic devices attached to the human skin or inserted into the human body may be performed by adopting the human body as a medium.

The air transmits radio waves isotropically, while the human body transmits radio waves anisotropically. Accordingly, a receiver existing at an arbitrary position in the human body is hard to receive accurate radio waves from a transmitter. Radio waves transmitted through the human body lose greater energy than radio waves transmitted through the air. Due to conductivity, the human body is easy to receive an interference signal from surrounding environment.

Physical layer architecture and requirements of human body communication are presented in IEEE 802.13.6 (WBAN) standards. When a frequency selective digital transmission (FSDT) scheme of the wireless body area network (WBAN) standards is used, data transmission at a maximum data rate of 1.3125 Mbps is enabled. However, according to such a method, a spectral efficiency becomes limited to maximum of 0.25 bps/Hz on the basis of a 3 dB bandwidth (5.25 MHz) presented by a transmission mask.

When a transmission filter for satisfying the transmission mask and a reception filter for removing noise from a receiver are used, intersymbol interference (ISI) occurs by the filters. Accordingly, there occurs a problem that bit error rate (BER) performance is degraded.

In addition, when a digital signal is transmitted and received over a network in which a human body is used as a medium, a high spectral efficiency is important. In order to achieve a high spectral efficiency, a preamble structure for transmission frame synchronization and a frame synchronization detection algorithm are required to be premised. Furthermore, a data transmission/reception device and method are required which may improve BER performance with low implementation complexity and low decoding complexity of a received signal.

SUMMARY

The present disclosure provides a preamble generating method for detecting frame synchronization for achieving a maximum spectral efficiency of 1 bps/Hz in transmitting a digital signal.

The present disclosure also provides a frame synchronization method for detecting an accurate frame position in a frame including a preamble of the above-described structure.

The present disclosure also provides an efficient frame synchronization detecting method for transmitting a digital signal, and a transmission device and a reception device for providing low complexity and improved bit error rate (BER) performance.

An embodiment of the inventive concept provides a method for generating a preamble of a transmission signal for human body communication, the method including: using a frequency shift code (FSC) of which a length is adjusted according to an operating clock frequency or a transmission rate and a first pseudo random binary sequence (PRBS) code of p chips where p is a natural number to generate a first preamble unit block of n chips where n is a natural number; using the FSC and a second PRBS code of p' chips to generate a second preamble unit block of n' chips; and arraying the first preamble unit block consecutively and repeatedly and disposing the second preamble unit block at a next stage to form the preamble of the transmission signal.

In an embodiments of the inventive concept, a frame synchronization method in a reception device for human body communication includes: receiving a frame including a preamble including a first preamble unit block and a second preamble unit block that are generated using a FSC of which a length is adjusted according to an operating clock frequency or a transmission rate and different pseudo noise codes; calculating a plurality of first correlation values between a third preamble unit block obtained by applying a distortion of a transmission filter or a reception filter to the first preamble unit block and the frame, and detecting whether the plurality of first correlation values exceeds a pre-determined threshold value a reference number of times at a reference period; when the first correlation values exceed the pre-determined threshold value the reference number of times, calculating, in a prescribed chip period, a plurality of second correlation values between a fourth preamble unit block obtained by applying the distortion of the transmission filter or the reception filter to the second preamble unit block and the frame; determining a position of a chip corresponding to a maximum value from among the plurality of second correlation values; and determining a position of a start chip of the frame with reference to the chip position corresponding to the maximum value and lengths of the first preamble unit block and the second preamble unit block.

In an embodiments of the inventive concept, a transmission device for human body communication includes: a preamble generator configured to use an FSC of which a length is adjusted according to an operating clock frequency or a transmission rate and a first PRBS code of p chips to generate a first preamble unit block of n chips, use the FSC and a second PRBS code of p chips to generate a second preamble unit block of n chips, and to array a plurality of the first preamble unit blocks and the second preamble unit block to form a preamble; a data generator configured to receive data and spread the data with the FSC to generate transmission data; and a multiplexer configured to couple the preamble and the transmission data to output as a transmission signal.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIGS. 17A and 17B are views showing features of a transmission preamble and a reception preamble according to the inventive concept;

DETAILED DESCRIPTION

Hereinafter, embodiments of the present invention will be described in detail with reference to the accompanying drawings so that the present invention can be easily realized by those skilled in the art.

Figure 1:
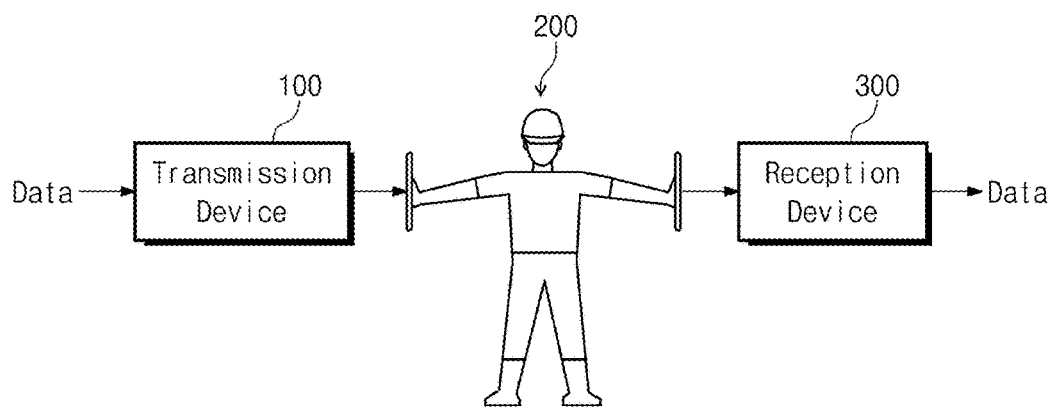
FIG. 1 is a block diagram of a human body communication system according to an embodiment of the inventive concept.

Hereinafter, according to embodiments of the inventive concept, for obvious explanation for effects of the proposed inventive concept and more advanced items than the existing method, it is assumed that an operating clock frequency used for a transmitter/receiver is 42 MHz according to physical layer architecture and requirements of human body communication that are internationally standardized in IEEE 802.15.6: wireless body area networks (WBAN). FIG. 1 is a block diagram of a human body communication system according to an embodiment of the inventive concept. Referring to FIG. 1, a human body communication system may include a transmission device 100, a human body 200, and a reception device 300.

The transmission device 100 is connected to a part of the human body 200 and modulates data, which has been delivered from the outside, to transmit the modulated data to the human body 200. The human body 200 operates as a channel for delivering a signal, which has been delivered from the transmission device 100, to the reception device 300. The reception device 300 receives a signal, which has been delivered from the human body 200, and recovers data. The recovered data may be delivered to the outside.

The transmission device 100 may generate a preamble having a structure according to an embodiment of the inventive concept. In addition, the reception device 300 may provide proper detection performance for a frame start position from a frame that has been transmitted from the transmission device 100 through a synchronization detecting method according to an embodiment of the inventive concept.

Figure 2:
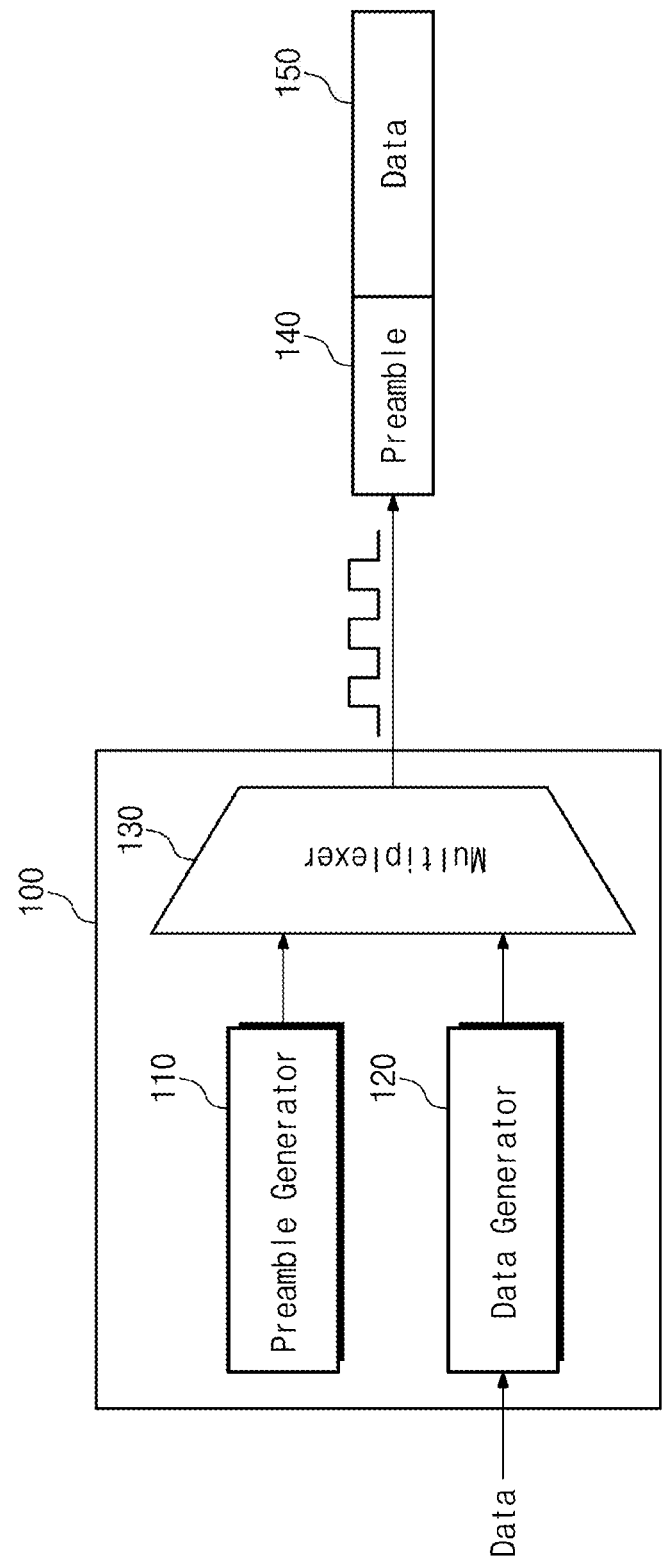
FIG. 2 is a block diagram schematically showing a function of a transmission device of the inventive concept.

FIG. 2 is a block diagram schematically showing a function of a transmission device of the inventive concept. Referring to FIG. 2, the transmission device 100 may include a preamble generator 110, a data generator 120, and a multiplexer 130.

The preamble generator 110 generates a preamble in which a preamble unit block code, which is constituted from n chips, is repeated k times. The preamble unit block code uses a pseudo random binary sequence (hereinafter PRBS) code that is constituted from p chips (where p is $2^m$). Here, as a type of PRBS code that is a source for generating the preamble unit block code, a code such as M-sequence, gold code, or Walsh code, which has a low correlation with another code, may be used.

At this point, a first to (k−1)-th preamble unit block codes employ an identical PRBS code, and a k-th preamble unit block uses a PRBS code different from the PRBS code used in the previous preamble unit block. In addition, the k-th preamble unit block may be constituted to have a different length from previous preamble unit blocks. Here, the first to (k−1)-th preamble unit block code is called A cell, the k-th preamble unit block code is called as B cell. For example, when p is 64, A cell may use codes from first to 64th codes of 128-chip PRBS code, and B cell may use codes from 65th to 128th codes of the 128-chip PRBS code.

In addition, the lengths of the first to (k−1)-th preamble unit blocks may be different from the length of the k-th preamble unit block. For example, the first to (k−1)-th preambles use a 64-chip PRBS code to make p to 64, and the k-th preamble uses a 128-chip PRBS code to make p to 128. Here, first and second PRBS codes having different lengths may be generated to have orthogonality to each other. For example, generator polynomials for generating the first and second PRBS codes are required to be different from each other. Accordingly, when the first and second PRBS codes are spread using an 8-chip frequency shift code (FSC), the length of the first to (k−1)-th preamble unit blocks become 512 and the length of k-th preamble unit block becomes 1024.

Then, an output signal that is spread using n/p FSCs is used as a preamble unit block code. For example, an 8-chip FSC is [01010101]. At this point, the bandwidth of the preamble may be determined as an 'operating clock frequency . . . p/n'. The feature of the preamble generator 110 will be described in relation to FIG. 3.

The data generator 120 may perform modulation on data provided from the outside. For example, the data generator 120 may perform channel coding on data delivered from the outside. The data generator 120 may perform block coding for adding parity bits for error correction to data. The data generator 120 may perform convolutional coding for determining data to be transmitted according to values of delivered data and previously delivered data. It may be well understood that the data generator 120 may modulate the block-coded data in a spread spectrum scheme.

The multiplexer 130 may form a digital transmission signal such as a frame or a packet using a preamble provided from the preamble generator 110 and modulated data output from the data generator 120. The multiplexer 130 delivers, to the human body 200 (see FIG. 1), the digital transmission signal into which the preamble 140 and the data 150 are combined.

Figure 3:
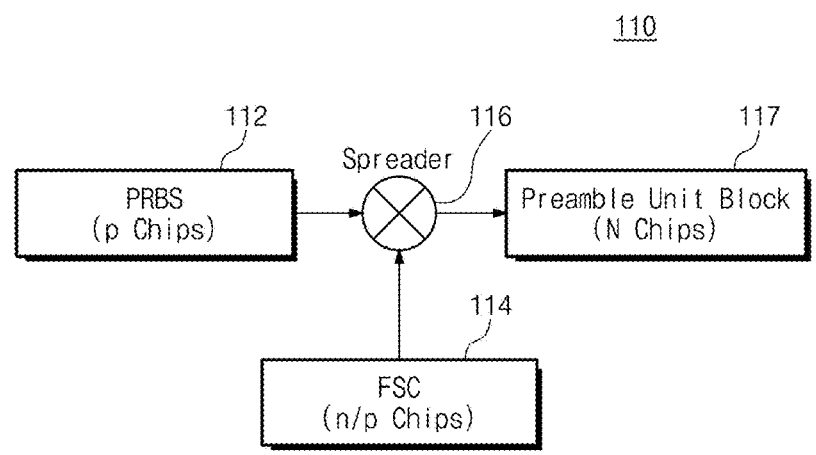
FIG. 3 is a view schematically showing a preamble structure according to an embodiment of the inventive concept.

FIG. 3 is a view schematically showing a preamble structure according to an embodiment of the inventive concept. Referring to FIG. 3, the preamble 140 of the inventive concept is formed to include a plurality of unit block codes generated using a PRBS code and an FSC code of which the length is adjusted according to an operating clock frequency and a transmission rate. One preamble unit block 117 may be formed of n chips. As illustrated, a p-chip PRBS code 112 is spread by an n/p-chip FSC code 114. For spreading the p-chip PRBS code 112, the spreader 116 may be formed to perform an XOR operation with the n/p-chip FSC code 114. When the p-chip PRBS code 112 is spread by the n/p-chip FSC code 114, the preamble unit block code 117 may be generated. Here, it will be well understood that the p-chip PRBS code 112 may be replaced with a code such as a gold code, a Walsh code, or an M-sequence, which has low correlation with another code.

Figure 4:
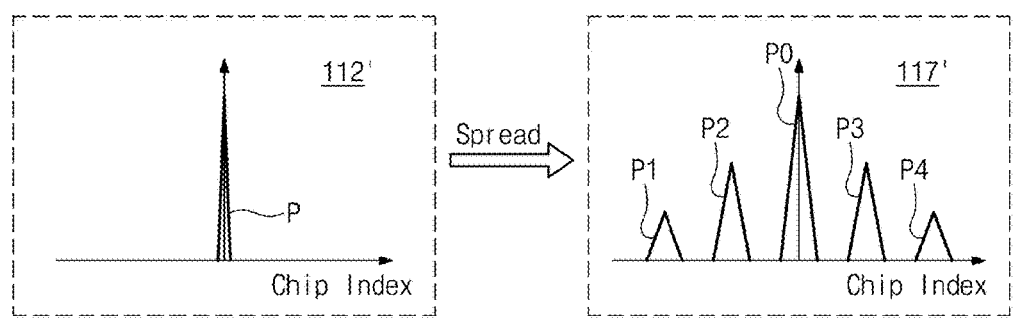
FIG. 4 is a view schematically showing an effect according to spread of the PRBS code illustrated in FIG. 3.

The spread operation will be exemplarily described as the following. When information bits [101] are spread with an 8-chip FSC code [01010101] in the spreader 116, a spread output signal of [10101010, 01010101, 10101010] may be generated. The spread output signal is generated by an XOR operation of each bit of the information bits [101] and the FSC code [01010101]. At this point, the bandwidth of the preamble may be determined with an 'operating clock frequency . . . p/n'. FIG. 4 is a view schematically showing an effect according to spread of the PRBS code illustrated in FIG. 3. Referring to FIG. 4, an autocorrelation value of the PRBS code 122 before being spread by the spreader 116 may be represented as a correlation function 112' represented with one peak P. Since the autocorrelation value of the PRBS code 112 is represented in one period, one peak appears. However, a plurality of peaks may appear in a plurality of periods.

However, for the preamble unit block 117 in which the PRBS code 112 is spread by the FSC [01010101], a plurality of peaks appear in one period. In an autocorrelation operation of the preamble unit block 117, a peak P0, which represents a highest autocorrelation value, may be observed at a precisely matched position. In addition, in peripherals, peaks P1, P2, P3, and P4 having relatively low correlation values may be observed. An increase in the number of peaks according to the spread is an effect derived from an operation with the FSC.

Figure 5:
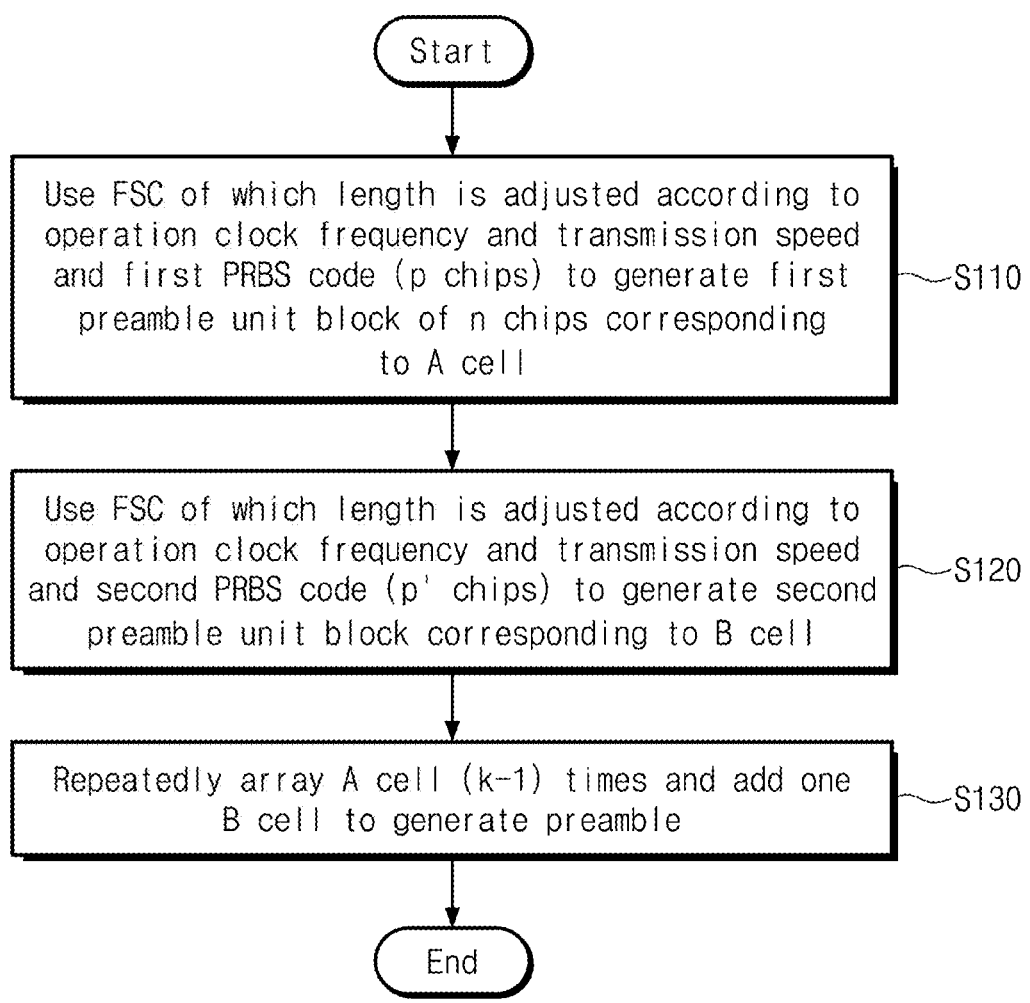
FIG. 5 is a flowchart schematically showing a method for generating a preamble unit block according to an embodiment of the inventive concept.

FIG. 5 is a flowchart schematically showing a method for generating a preamble unit block according to an embodiment of the inventive concept. Referring to FIGS. 3 to 5, a transmission preamble according to an embodiment of the inventive concept is generated using a PRBS code and an FSC of which the length is adjusted according to an operating clock frequency and a transmission rate. When the FSC and PRBS code are used to generate the preamble unit block code and the generated preamble unit block is arrayed in a plurality of times, a transmission preamble of the inventive concept may be generated.

In operation S110, A cell may be generated using a first PRBS code of p chips and the FSC of which the length is adjusted according to the operating clock frequency and transmission rate. A cell is called a first preamble unit block. Here, when the A cell has n chips, the FSC may be formed of n/p chips.

In operation S120, B cell may be generated using a second PRBS code of p' chips and the FSC of which the length is adjusted according to an operating clock frequency and a transmission rate. B cell is called a second preamble unit block. Here, when the B cell has n chips, the FSC may be formed of n/p' chips. In addition, the second PRBS code has a code sequence different from the first PRBS code. Here, the length p' of the second PRBS code may be equal to or longer than the length p of the first PRBS code. For example, when it is assumed that p has 64 chips, the first PRBS code may correspond to first to 64th codes of 128-chip PRBS code and the second PRBS code may correspond to 65th to 128th codes of 128-chip PRBS code. Alternatively, it may be assumed that the length p of the first PRBS code is 64 chips and the length p' of the second PRBS code is 128 chips. Here, first and second PRBS codes having different lengths may have orthogonality to each other. For example, the first PRBS code and the second PRBS code are required to be respectively generated by different generator polynomials.

In operation S130, a first preamble unit block, which corresponds to A cell, is repeatedly arrayed in the plurality of times (for example, (k−1) times). In addition, when a second preamble unit block, which corresponds to B cell, is added to the end thereof, a transmission preamble may be formed. Accordingly, the transmission preamble may be considered as k n-chip preamble unit blocks being arrayed.

The transmission preamble generated according to the above-described procedure may be inserted into a frame formed through data and may be transmitted.

Figure 6A:
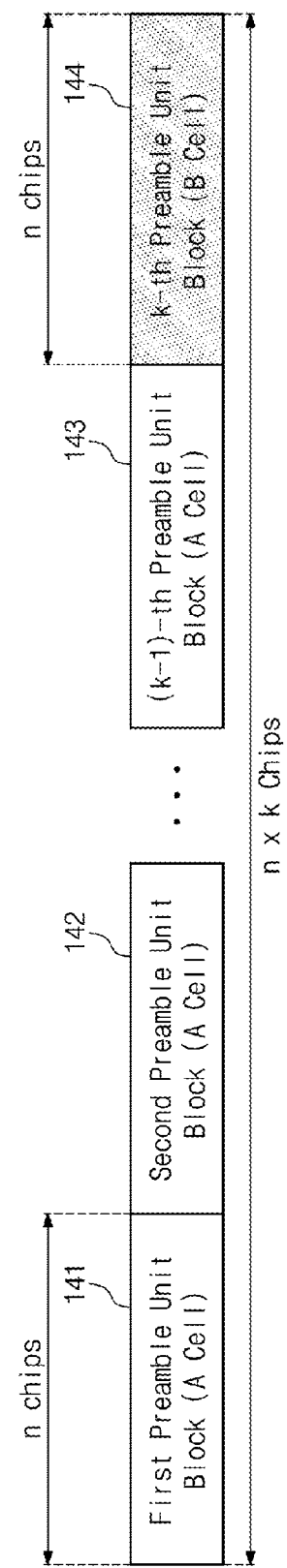
FIGS. 6A and 6B are views exemplarily showing transmission preamble types generated by the above-described schemes.
Figure 6B:
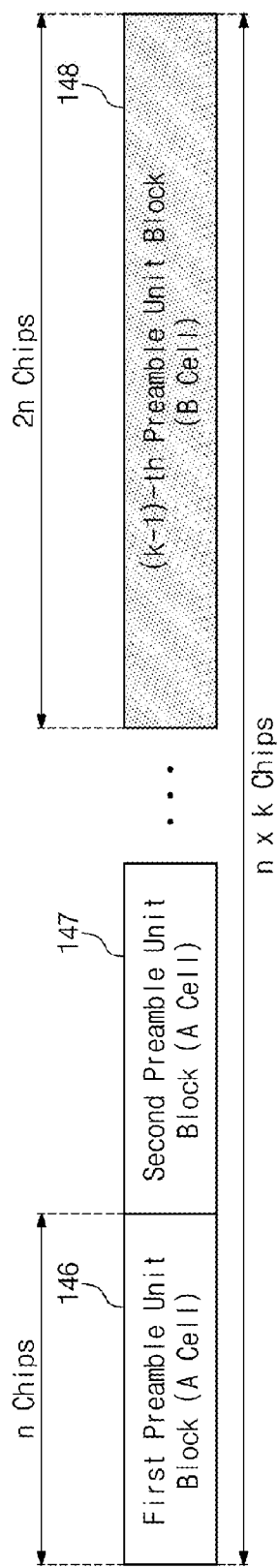

FIGS. 6A and 6B are views exemplarily showing transmission preamble types generated by the above-described schemes.

Referring to FIG. 6A, a preamble 140 is formed of preamble unit blocks A cells and B cell generated using a first PRBS code and a second PRBS code having an identical length. First to (k-1)-th preamble unit block codes 141, 142, ..., 143, each of which is formed of n chips, may be generated by spreading the first PRBS code. A k-th preamble block code 145 formed of n chips may be generated by spreading the second PRBS code. In other words, the preamble 140 may be formed for 'n×k' chips by the preamble unit blocks 141, 142, ..., 143, and 145.

Here, the first PRBS code and the second PRBS code are required to be generated with different generator polynomials. The first to (k-1)-th preamble unit blocks 141, 142, ..., 143 may use the identical first PRBS code. And the k-th preamble unit block 145 uses the second PRBS code, which is different from the first PRBS code used in the first to (k-1)-th preamble unit blocks 141, 142, ..., 143. For example, when p is assumed to be 64, A cell may be generated using codes from first to 64th codes of 128-chip PRBS code, and B cell may be generated using codes from 65th to 128th codes of the 128-chip PRBS code. Such 64-chip PRBS codes may be spread using n/p-chip FSC to generate the preamble unit blocks 141, 142, ..., 143, and 145.

Referring to FIG. 6B, a preamble 140' is formed of preamble unit blocks A cells and B cell generated using a first PRBS code and a second PRBS code having different lengths. The length of first to (k-2)-th preamble unit blocks A cells and the length of the (k-1)-th preamble unit block B cell may be different. For example, the first to (k-2)-th preambles use a 64-chip PRBS code to make p to 64, and the (k-1)-th preamble uses a 128-chip PRBS code to make p to 128. Here, first and second PRBS codes having different lengths may be generated to have orthogonality to each other. For example, generator polynomials for generating the first and second PRBS codes are required to be different from each other. Accordingly, when the first and second PRBS codes are spread using an 8-chip FSC, the length of the first to (k-1)-th preamble unit blocks becomes 512 and the length of (k-1)-th preamble unit block becomes 1024. Here, it is exemplarily described that the length of the preamble unit block B cell is double the length of the preamble unit blocks A cells, but the inventive concept is not limited thereto. For example, it may be well understood that all cases where the length of the preamble unit block B cell and the length of the preamble unit blocks A cells are different may be included in the feature of the inventive concept.

Figure 7:
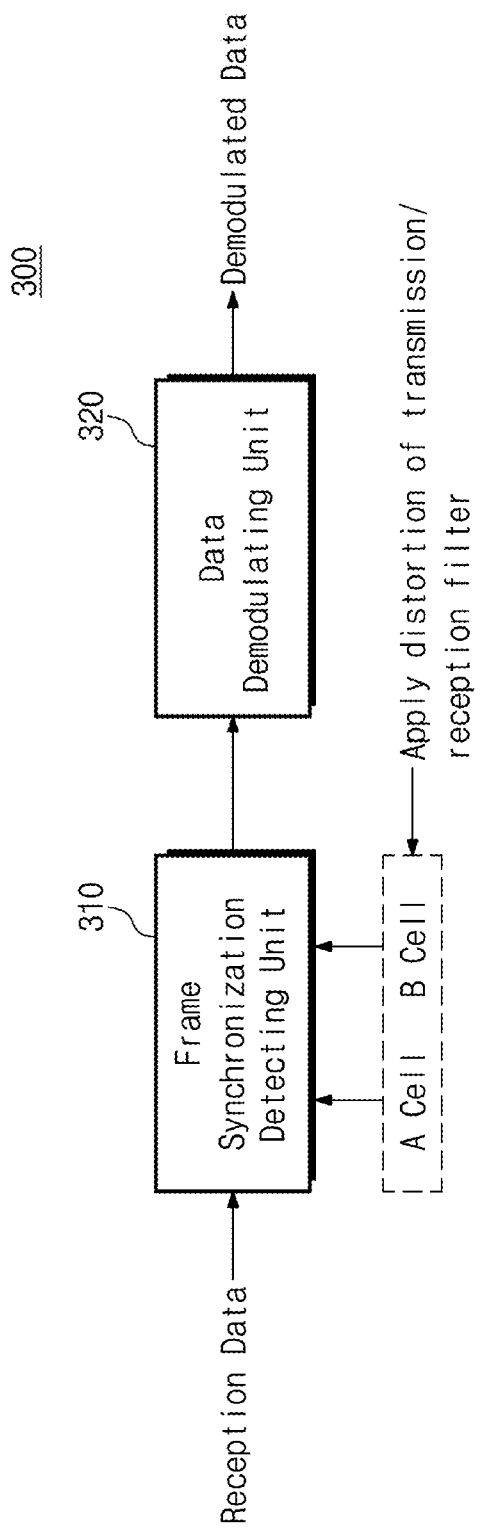
FIG. 7 is a block diagram showing a receiving unit for receiving reception data including a preamble according to an embodiment of the inventive concept.

FIG. 7 is a block diagram showing a receiving unit for receiving reception data including a preamble according to an embodiment of the inventive concept. Referring to FIG. 7, a reception unit 300 includes a frame synchronization unit 310 for receiving a preamble, which is formed of different preamble unit blocks A cells and B cell of the inventive concept, and a data demodulating unit 320. In addition, the reception data in the inventive concept is assumed to be a binary value of 0 or 1 obtained by performing hard-decision on a reception signal.

The frame synchronization detecting unit 310 may detect a data start period by using a preamble for a stream of the reception data. In particular, the frame synchronization detecting unit 310 of the inventive concept may use preamble unit blocks A cells and B cell in which effects of a transmission filter and a reception filter are considered. A preamble transmitted from the transmitting unit 100 of the inventive concept may substantially include distortions by the transmission filter and the reception filter included in the receiving unit 300. The preamble unit blocks A cells and B cell in which the first PRBS code and the second PRBS code generated by different generator polynomials are spread may have consistent distortion characteristics for the transmission filter and reception filter defined in a communication system. Accordingly, the preamble unit blocks A cells and B cell exemplarily illustrated in FIGS. 6A and 6B are provided to have values to which the distortions by the transmission filter and reception filter are applied. In other words, the preamble unit blocks A cells and B cell provided for correlation calculation in the frame synchronization detecting unit 310 may be different from the preamble unit blocks A cells and B cell generated in the transmitting unit 100.

The data demodulating unit 320 demodulates data starting from a frame start period detected by the frame synchronization detecting unit 310.

Figure 8:
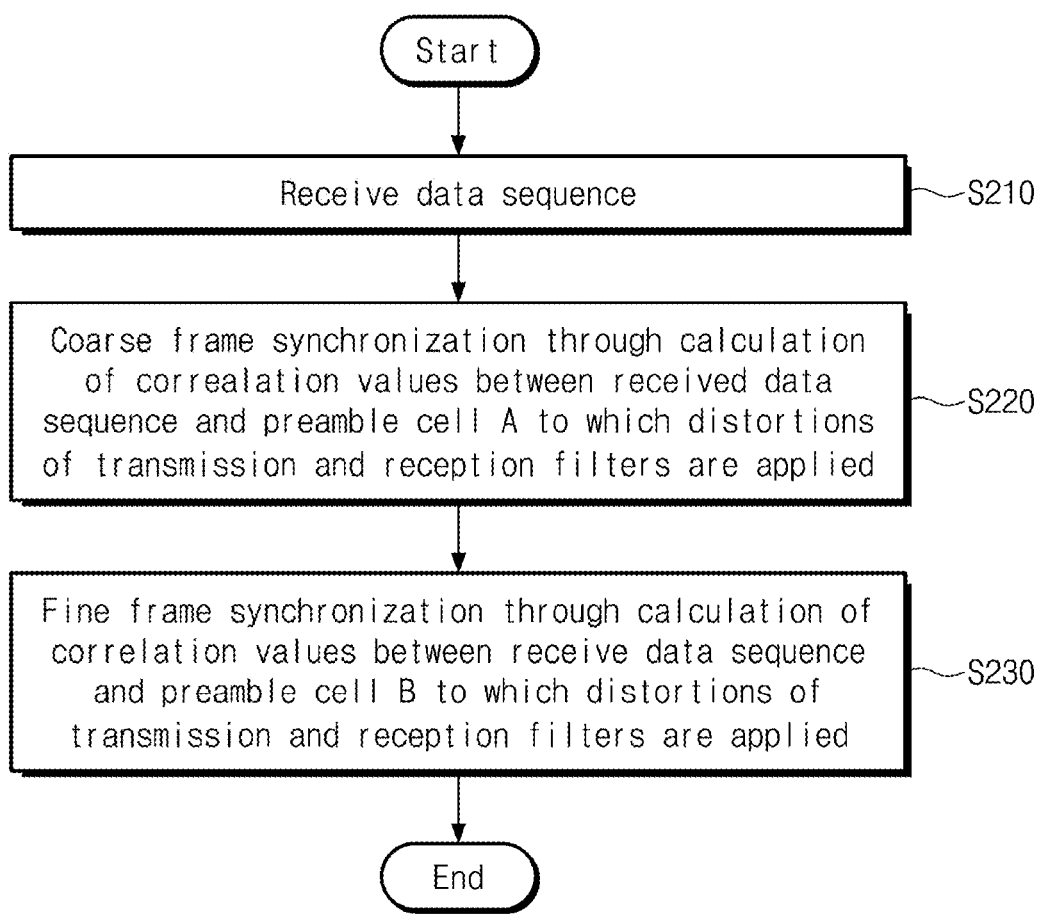
FIG. 8 is a flowchart schematically showing a frame synchronization method performed in the frame synchronization detecting unit 310 of FIG. 7.

FIG. 8 is a flowchart schematically showing a frame synchronization method performed in the frame synchronization detecting unit 310 of FIG. 7. Referring to FIG. 8, a frame synchronization method in which signal distortions of the transmission and reception filters are considered will be described.

In operation S210, the frame synchronization detecting unit 310 may receive reception data provided as a stream. Transmission data may be processed by the transmission filter in the transmitting unit 100. In addition, when the data is received, the received data is filtered with a reception filter in the receiving unit 300. Accordingly, distortions generated in the transmission and reception filters may be included in the reception data.

In operation S220, coarse frame synchronization is performed on a reception data sequence and A cells that are the preamble unit blocks. Here, A cell is a preamble unit block to which distortion characteristics of the above-described transmission and reception filters are applied. Correlation values are calculated using A cells and whether the correlation values exceed a pre-defined threshold value may be detected. Here, at least two A cells may exist in the preamble. Accordingly, whether the preamble is received and an approximate position of the preamble may be detected using a plurality of A cells.

In operation S230, the frame synchronization detecting unit 310 detects an accurate start position of the preamble with reference to the result of operation S220. In other words, through the correlation value calculation for the reception data sequence and B cell, a chip position at which a highest correlation value is positioned may be detected. For example, a fine frame synchronization operation, which detects an accurate peak position according to a maximum likelihood scheme from among correlation values of B cell, may be performed. The frame synchronization detecting unit 310 may determine, as the preamble start position, a value obtained by subtracting the number of chips corresponding to the number of B cell and A cells from the detected chip position.

Figure 9:
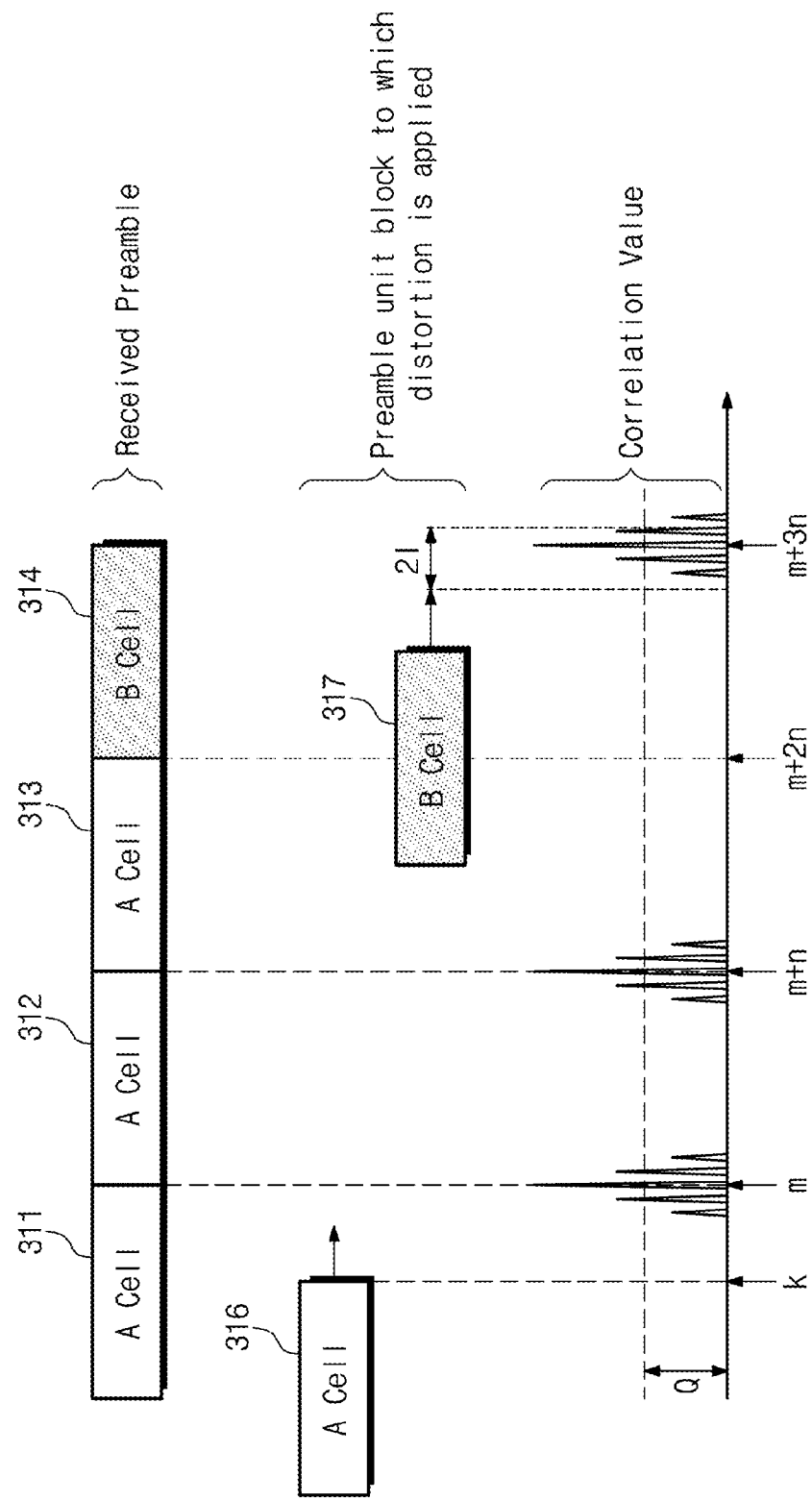
FIG. 9 is a view schematically showing a frame synchronization method of the inventive concept.

FIG. 9 is a view schematically showing a frame synchronization method of the inventive concept. Referring to FIG. 9, a frame synchronization method for a preamble, which is formed of three A cells 311, 312, and 313 and one B cell 314 having the identical length, will be described. Here, it is assumed that there is no noise in each correlation value peak.

Firstly, when a preamble is received, the frame synchronization detecting unit 310 (see FIG. 7) may use A cell 316 among the preamble unit blocks to which a distortion is applied to calculate correlation values with the received preamble. For example, it is assumed that correlation value calculation using A cell 316 is performed from a chip position k. Then, a largest peak value may be detected at a chip position m at which the received preamble 311 and A cell 316 overlap. However, in the coarse frame synchronization by A cell 316, not an accurate chip position but whether the preamble has been received is detected. Accordingly, in the coarse frame synchronization by A cell 316, if the number of times when a correlation value exceeds a threshold value Q around boundaries of cells exceeds the reference number of times, it may be determined that the preamble is received. In other words, as a result of calculation of correlating A cell 316 with the preamble, when the level of the correlation value is detected to be larger than the threshold value Q at least twice around chip positions m, m+n, and m+2n, it may be considered that the preamble is received.

Then, the frame synchronization detecting unit 310 may perform correlation value calculation using B cell 317 around the chip position m+3n. The frame synchronization detecting unit 310 may detect a largest correlation value from among correlation values around the chip position m+3n. When the largest correlation value is determined according to the maximum likelihood scheme, a position at which the number 4n of chips of 4 preamble unit blocks is subtracted from the position m+3n at which the largest correlation value has been detected may be determined as a start position of the preamble.

Figure 10:
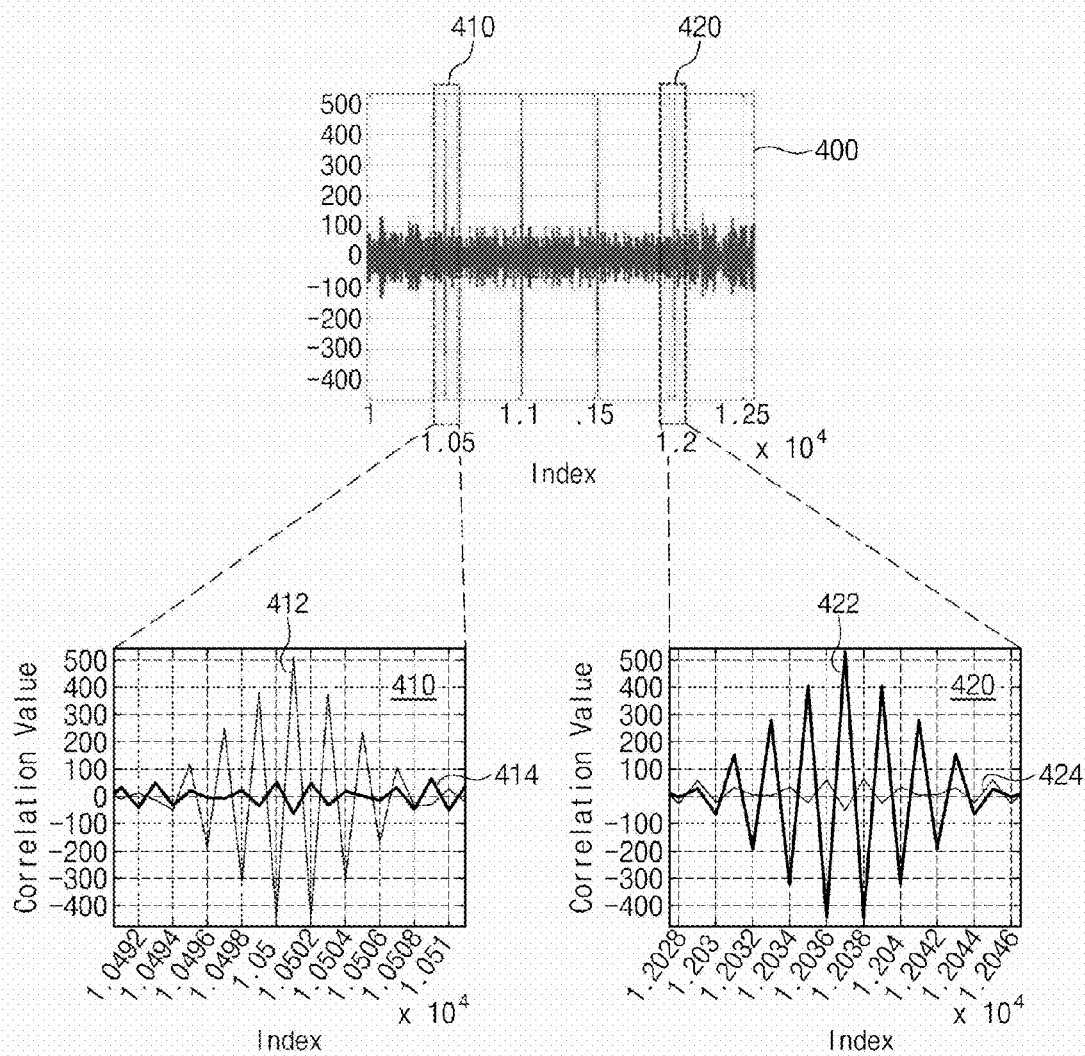
FIG. 10 is a view schematically showing an autocorrelation value of a preamble signal according to an embodiment of the inventive concept.

FIG. 10 is a view schematically showing an autocorrelation value of a preamble signal according to an embodiment of the inventive concept. Referring to FIG. 10, autocorrelation values of a preamble signal are illustrated under a condition set as n=512, p=64, and k=8 such that an operating clock frequency of 42 MHz and a transmission mask are satisfied.

Firstly, the characteristics of the autocorrelation values of the preamble signal may be expressed as Equation (1).

$$\text{autocorrelation}(k) \equiv \sum_{r=0}^{n-1} h_{k+r} q_r \quad (1)$$

where, k denotes a position of a k-th chip, h denotes a modeling signal generated by inserting an arbitrary bipolar binary signal before and after the preamble. In other words, h is a value mapped to '+1' when the binary value is '1', and to '−1' when the binary value is '0'. When a delay value of the received preamble is given as '10500', two start positions of the preamble are exactly coincided, and q denotes a preamble unit block code. Here, q is a value mapped to a bipolar binary signal. In other words, q is a value mapped to '+1' when the binary value is '1', and to '−1' when the binary value is '0'.

A graph 400 representing autocorrelation values represents values calculated by adopting A cells and B cell as preamble unit block codes corresponding to q. As illustrated, when each preamble unit block code overlaps and positions of start chips become coincided, correlation value peaks occur at three positions at which chip positions calculated by adopting A cells as preamble unit block codes corresponding to q are respectively 10501 (index 1.05), 11013 (index 1.1) and 11525 (index 1.5). It is also shown that a correlation peak occurs at one position at which a chip position calculated by adopting B cell as a preamble unit block code corresponding to q is 12037 (index 1.2).

A specific type of an autocorrelation value at a position where an index of the chip position is 10501 is illustrated as an identification number 410. At this point, an autocorrelation value calculated by adopting A cell as a preamble unit block code may be extended in a curve type 412. On the other hand, an autocorrelation value calculated by adopting B cell as a preamble unit block code may be represented as a curve type 414 in a relatively small size.

A specific type of an autocorrelation value at a position where an index of the chip position is 12037 is illustrated as an identification number 420. At this point, an autocorrelation value calculated by adopting B cell as a preamble unit block code may be extended in a curve type 422. On the other hand, an autocorrelation value calculated by adopting A cell as a preamble unit block code may be represented as a curve type 424 in a relatively small size.

Figure 11:
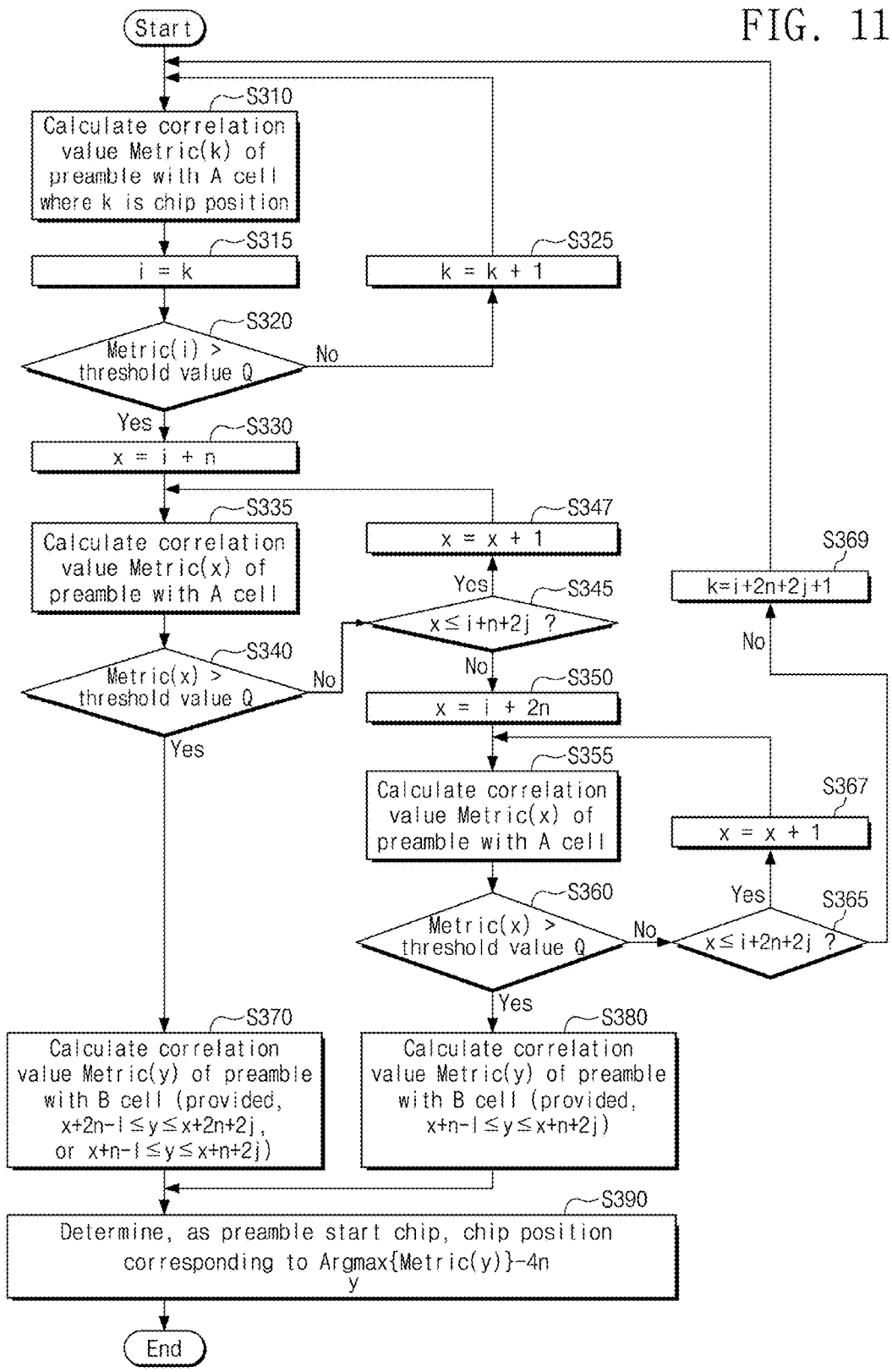
FIG. 11 is a flowchart showing a method for detecting frame synchronization in a preamble structure in which a preamble unit block (A cell) is repeated three times and a preamble unit block (B cell) is followed.

FIG. 11 is a flowchart showing a method for detecting frame synchronization in a preamble structure in which a preamble unit block (A cell) is repeated three times and a preamble unit block (B cell) is followed. FIG. 11 is a flowchart illustrating a method for effectively detecting a preamble in a preamble structure of the inventive concept.

In operation S310, a reception device 300 may use A cell to which a distortion of a transmission/reception filter is applied to calculate a correlation value with a received signal. At this point, a metric for calculating a correlation value may be expressed as the following Equation (2).

$$\text{Metric}(k) \equiv \sum_{r=0}^{n-1} d_{k+r} q_r \quad (2)$$

where, k denotes a k-th chip position and q denotes a preamble unit block code. In addition, d denotes a binary value for each chip of a reception signal (a reception chip signal) detected by hard decision. Here, d and q are bipolar binary signals in which logic '1' is mapped to '+1' and logic '0' is mapped to '−1'. In addition, a chip position r represents a chip position at which a correlation value is started to be calculated using A cell to which a distortion is applied.

In operation S315, a chip position k is marked as a chip position i. A metric value representing a correlation value by A cell at the chip position i is identical to a metric at the chip position k. Operation S315 is only an operation for convenience of management defined in a case where the correlation value at the chip position k exceeds the threshold value Q, and has no particular meaning.

In operation S320, it is detected whether the calculated magnitude of the metric at an i-th chip is greater than the pre-determined threshold value Q. When the magnitude of the metric at the i-th chip is not greater than the prescribed threshold value Q (No), the procedure moves to operation S325 for calculating a metric at a position moved by one chip. On the other hand, when the magnitude of the metric at the i-th chip is greater than the prescribed threshold value Q (Yes), the frame synchronization detecting unit 310 assumes that the first or second A cell has been detected and the procedure moves to operation S330 for calculating a metric at a position moved by one preamble unit block.

In operation S325, A cell may be moved to a (k+1)-th chip position on the received signal. Then, in operation S310, a metric corresponding to a correlation value may be calculated.

In operation S330, a cell position at which a metric is to be calculated is moved by the length, namely, n chips of the preamble unit block. In other words, the cell position is moved to a chip position (i+n) increased by one preamble unit block, namely, n chips from the chip position i at which the threshold value Q is first exceeded. The chip position at this point is represented as 'x'.

In operation S335, a metric Metric (x) is calculated at a chip position (x=i+n) at which A cell is increased by one preamble unit block, namely, n chips. In other words, a correlation value is calculated using A cell at the chip position x. In operation S340, it is detected whether the Metric(x) corresponding to the correlation value exceeds the threshold value Q. When the magnitude of the Metric (x) is greater than the threshold value Q (Yes direction), the procedure moves to operation S370. However, when the magnitude of the Metric (x) is not greater than the threshold value Q, the procedure moves to operation S345.

A loop of operation S345, operation S347, operation S335, and operation S340 is an operation for detecting whether the correlation value exceeds the threshold value Q around the chip position (x=i+n). In operation S345, it is detected whether the chip position x exceeds a pre-determined period (i+n+2j), where j depends on the number of peaks of correlation values, namely, changes according to the length of the FSC. When the chip position x is not determined to exceed the pre-determined period (i+n+2j) (Yes direction), the procedure continues the operation loop including operation S347, operation S335, and operation S340. However, when the chip position x is determined to exceed the pre-determined period (i+n+2j) (No direction), the procedure moves to operation S350.

In operation S350, since the correlation value is not determined to exceed the threshold value Q around the chip position x, the chip position may be further moved by the length n of the preamble unit block. In other words, for additional correlation value calculation by A cell, the chip position may be moved to a chip position (i+2n) corresponding to the third A cell.

A loop of operation S355, operation S360, operation S365, and operation S367 is an operation for detecting whether a correlation value exceeds the threshold value Q around a chip position (x=i+2n) at which the third A cell is expected to exist among the consecutive A cells. In operation S355, the Metric (x) is calculated at the chip position (x=i+2n) by using A cell. In operation S360, it is detected whether the Metric(x) exceeds the threshold value Q. When the magnitude of the Metric (x) is greater than the threshold value Q (Yes direction), the procedure moves to operation S380. However, when the magnitude of the Metric (x) is not greater than the threshold value Q, the procedure moves to operation S365.

In operation S365, it is detected whether the chip position x exceeds a pre-determined period (i+n+2j), where j depends on the number of peaks of correlation values, namely, changes according to the length of the FSC. When the chip position x is not determined to exceed the pre-determined period (i+n+2j) (Yes direction), the procedure continues the operation loop including operation S367, operation S355, and operation S360. However, when the chip position x is determined to exceed the pre-determined period (i+n+2j) (No direction), the procedure moves to operation S369. That the chip position x is determined to exceed the pre-determined period (i+2n+2j) means that after a first peak is once detected, detection of peaks fails around the chip positions (i+n) and (i+2n) at which peaks are expected to be detected consecutively. Accordingly, in operation S369, the procedure returns to operation S310 for calculating a correlation value by using the first A cell at a chip position (i+2n+2j+1).

Operation S370 and operation S380 are a fine frame synchronization operation for detecting a precise preamble position by using B cell to which a distortion is applied in a case where at least two chip positions are determined to be detected from among three A cells. In operation S370, a Metric (y), which corresponds to a correlation value with the reception signal, may be calculated using B cell. Here, since corresponding to a case where first and second preamble unit blocks are detected with A cell, the chip position y corresponds between a (x+2n−1)-th chip and a (x+2n+2j)-th chip, where 1 is a positive integer including 0. In addition, since corresponding to a case where the second and third preamble unit blocks are detected with A cell, the chip position y corresponds between (x+n−1)-th chip and (x+n+2j)-th chip. In operation S380, since corresponding to a case where the first and third preamble unit blocks are detected with A cell, the chip position y for calculating a correlation value with B cell corresponds between the (x+n−1)-th chip and the (x+n+2j)-th chip.

In operation S390, a chip position at which a correlation value calculated using B cell is a greatest may be detected. For example, a fine frame synchronization operation, which detects a precise peak position according to a maximum likelihood scheme from among correlation values of B cell, may be performed. The frame synchronization detecting unit 310 may determine, as the preamble start position, a value obtained by subtracting the number of chips corresponding to the number of B cell and A cells from the detected chip position. For example, a chip position obtained by subtracting the size 4n of four preamble unit blocks from the chip position at which the correlation value is the greatest may be determined as a preamble start chip.

Hereinbefore, the method for detecting the position of the preamble start chip has been described in a preamble structure of the inventive concept.

Figure 12:
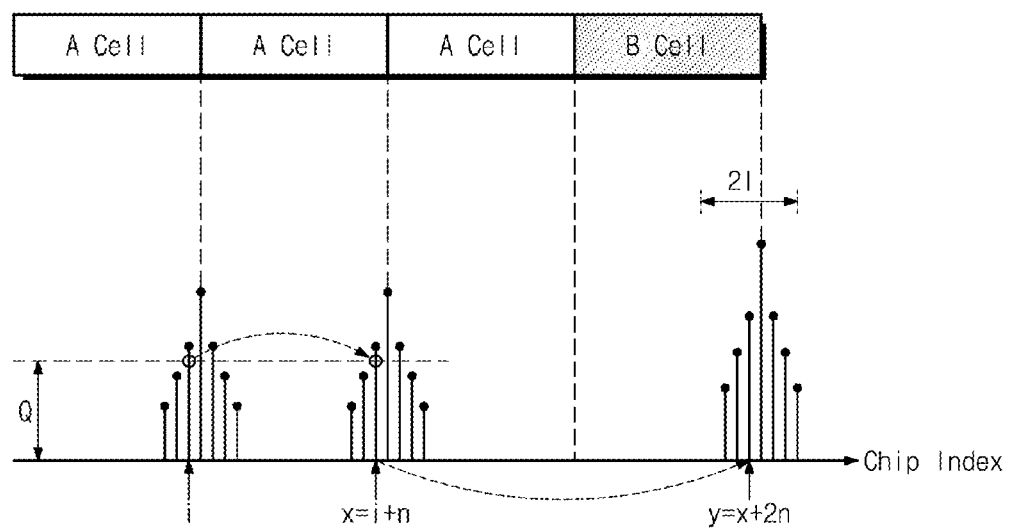
FIGS. 12 and 13 are views respectively explaining exemplary cases of a coarse frame synchronization method and a fine frame synchronization method using a correlation value calculation result for a preamble.
Figure 13:
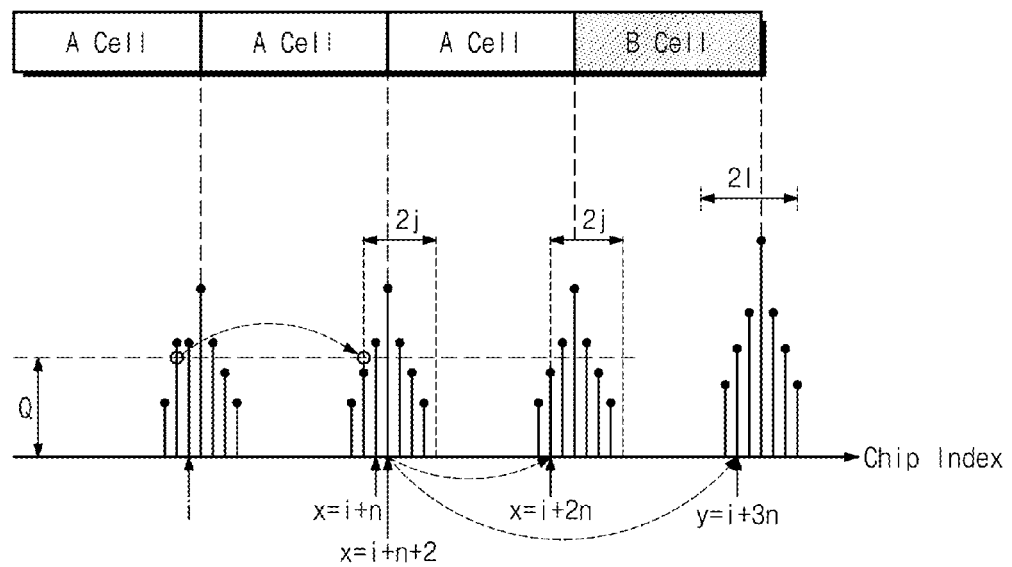

FIGS. 12 and 13 are views respectively explaining exemplary cases of a coarse frame synchronization method and a fine frame synchronization method using a correlation value calculation result for a preamble.

FIG. 12 shows a case where it is detected that correlation values with A cell at consecutive chip positions i and (i+n) consecutively exceed the threshold value Q. In this case, it is determined that the preamble is received and correlation value calculation using B cell is performed around a chip position (y=x+2n) in order to detect an accurate preamble position.

FIG. 13 illustrates a case where it is detected that a correlation value with A cell exceeds the threshold value due to noise at the chip position i. When the correlation value is detected to exceed the threshold value Q at the chip position i, correlation values with A cell may be further calculated in the periphery (in the range of 2j) of the chip position (i+n). At this point, when the correlation value is detected to exceed the threshold value Q in the periphery (in the range of 2j) of the chip position (i+n), correlation values with B cell may be calculated at a moved chip position (y=i+3n). However, when the correlation value is not detected to exceed the threshold value Q in the periphery (in the range of 2j) of the chip position (i+n), correlation value calculation with the A cell may be further performed at the periphery (in the range of 2j) of the chip position (i+2n). When it is also detected that the correlation value does not exceed the threshold value Q in the periphery (in the range of 2j) of the chip position (i+2n) at this point, it may be determined that the preamble has not been received.

Figure 14:
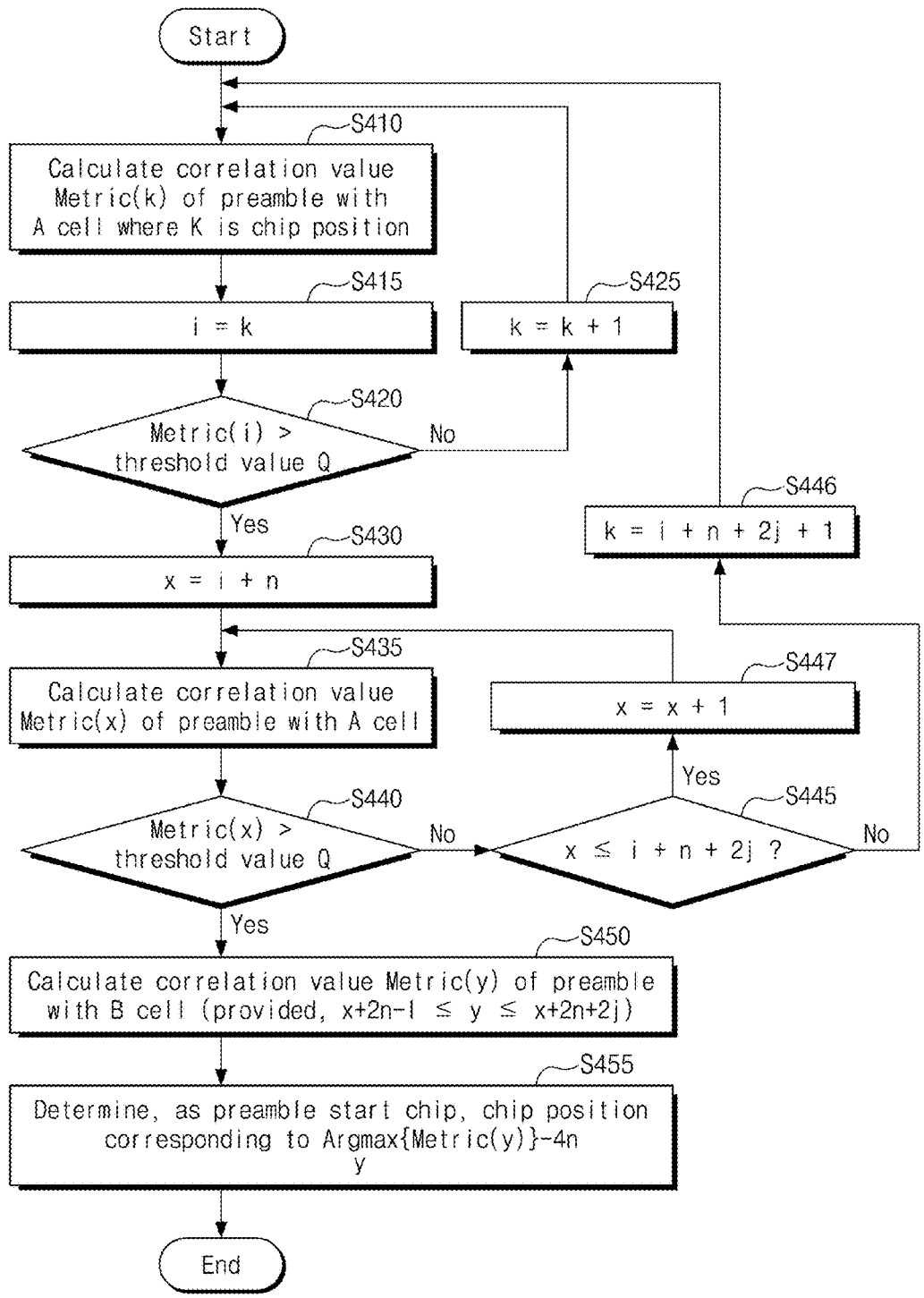
FIG. 14 is a flowchart illustrating a method for detecting frame synchronization from a preamble in which lengths of A cell and B cell are different.

FIG. 14 is a flowchart illustrating a method for detecting frame synchronization from a preamble in which lengths of A cell and B cell are different. For example, a method is illustrated which detects frame synchronization in a preamble in which a preamble unit block A cell having the n chip length are repeated twice and a preamble unit block B cell having the 2n chip length is followed. FIG. 14 is a flowchart illustrating a method for effectively detecting a preamble in a preamble structure of the inventive concept.

In operation S410, the frame synchronization detecting unit 310 may use A cell to which a distortion by a transmission/reception filter is applied to calculate a correlation value with a received signal. At this point, a metric for calculating the correlation value may be calculated according to the above-described Equation (2).

In operation S415, a chip position k is marked as a chip position i. A metric value representing a correlation value with A cell at the chip position i is identical to a metric at the chip position k. Operation S415 is only an operation for convenience of management defined in a case where the correlation value at the chip position k exceeds the threshold value Q, and has no particular meaning.

In operation S420, it is detected whether the calculated magnitude of the metric at an i-th chip is greater than the pre-determined threshold value Q. When the magnitude of the metric at the i-th chip is not greater than the prescribed threshold value Q (No), the procedure moves to operation S425 for calculating a metric at a position moved by one chip. On the other hand, when the magnitude of the metric at the i-th chip is greater than the prescribed threshold value Q (Yes), the frame synchronization detecting unit 310 assumes that a first or second A cell has been detected and the procedure moves to operation S430 for calculating a metric at a position moved by one preamble unit block.

In operation S425, A cell may be moved to a (k+1)-th chip position on a received signal. Then, in operation S410, a metric corresponding to a correlation value may be calculated.

In operation S430, a cell position at which the metric is calculated is moved by the length, namely, n chips of the preamble unit block. In other words, the cell position is moved to a chip position (i+n) increased by one preamble unit block, namely, n chips from the chip position i at which the threshold value Q is first exceeded. The chip position at this point is represented as 'x'.

In operation S435, a metric Metric (x) is calculated at a chip position (x=i+n) at which A cell is increased by one preamble unit block, namely, n chips. In other words, a correlation value is calculated using A cell at the chip position x. In operation S440, it is detected whether the Metric(x) corresponding to the correlation value exceeds the threshold value Q. When the magnitude of the Metric (x) is greater than the threshold value Q (Yes direction), the procedure moves to operation S450. However, when the magnitude of the Metric (x) is not greater than the threshold value Q, the procedure moves to operation S445.

A loop of operation S445, operation S447, operation S435, and operation S440 is an operation for detecting whether the correlation value exceeds the threshold value Q around the chip position (x=i+n). In operation S445, it is detected whether the chip position x exceeds a pre-determined period (i+n+2j), where j depends on the number of peaks of correlation values, namely, changes according to the length of the FSC. When the chip position x is not determined to exceed the pre-determined period i+n+2j (Yes direction), the procedure continues the operation loop including operation S447, operation S435, and operation S440. However, when the chip position x is determined to exceed the pre-determined period (i+n+2j) (No direction), it is determined that the preamble has not been received and the procedure moves to operation S410 via operation S446.

When it is determined that both chip positions of two A cells are detected, operation S450 is a fine frame synchronization operation for detecting a precise preamble position by using B cell to which a distortion is applied. Firstly, Metric (y), which corresponds to a correlation value with the reception signal, may be calculated using B cell to which a distortion having a different length is applied. Here, the chip position y corresponds between (x+2n−1) and (x+2n+2j), where l is a positive integer including 0.

In operation S455, a chip position at which a correlation value calculated using B cell is a greatest may be detected. For example, a fine frame synchronization operation, which detects a precise peak position according to a maximum likelihood scheme from among correlation values with B cell, may be performed. The frame synchronization detecting unit 310 may determine, as the preamble start position, a value obtained by subtracting the number of chips corresponding to the number of B cell and A cells from the detected chip position. For example, a chip position obtained by subtracting the size 4n of four preamble unit blocks from the chip position at which the correlation value is the greatest may be determined as a preamble start chip.

Hereinbefore, the method for detecting the position of the preamble start chip has been described in a preamble structure of the inventive concept.

Figure 15:
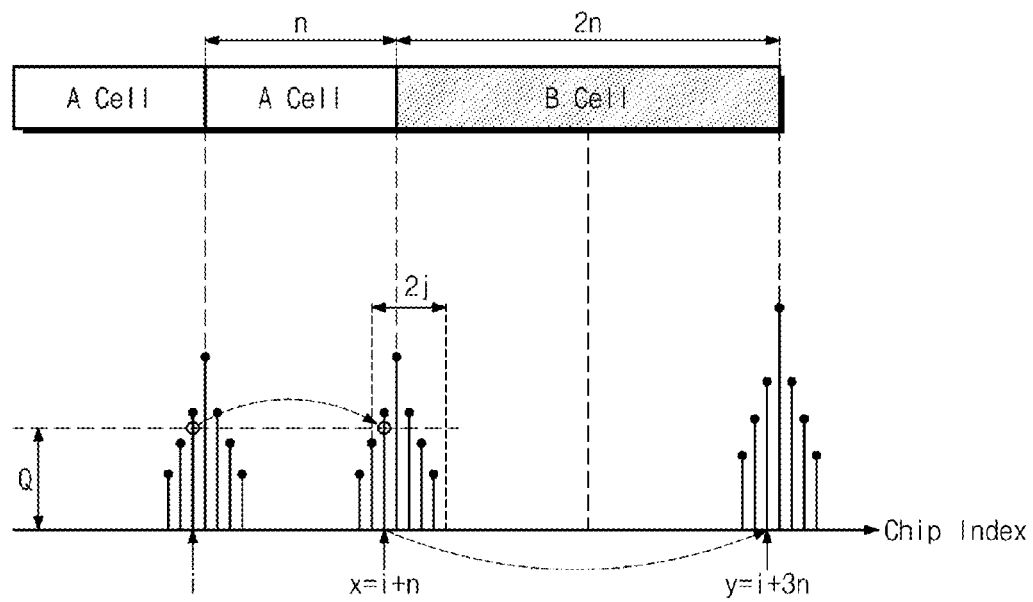
FIG. 15 is a view explaining a coarse frame synchronization method and a fine frame synchronization method using correlation value calculation result for a preamble having preamble unit blocks having different lengths.

FIG. 15 is a view for explaining a coarse frame synchronization method and a fine frame synchronization method using correlation value calculation results for a preamble having preamble unit blocks of different lengths. FIG. 15 shows a case where it is detected that correlation values with A cell at consecutive chip positions i and (i+n) consecutively exceed the threshold value Q. In this case, it is determined that the preamble has been received and correlation value calculation using B cell is performed around a chip position (y=x+2n=i+3n) in order to detect a precise preamble position. Since the length of B cell is longer than that of A cell, the magnitude of the correlation value with B cell may be detected to be relatively large.

Figure 16:
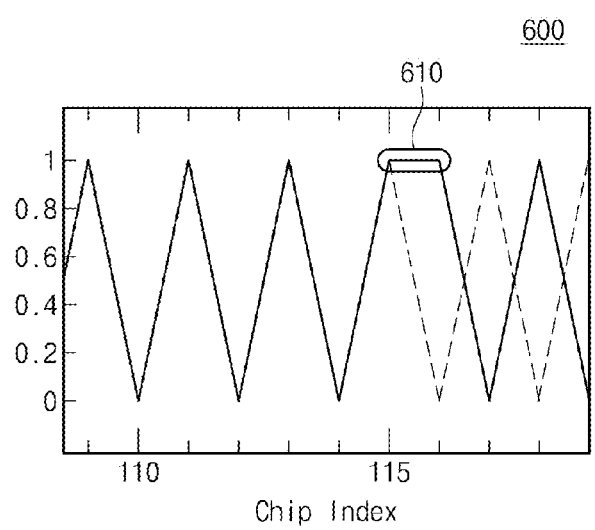
FIG. 16 is a view showing a channel distortion of a preamble using different unit blocks (A cell and B cell) of the inventive concept.

FIG. 16 is a view showing a distortion on a preamble channel using different unit blocks (A cell and B cell) of the inventive concept. In other words, FIG. 16 shows a bit stream distortion by a transmission filter of the transmitting unit 100 and a reception filter provided in the receiving unit 300. In the transmitting unit 100 of the inventive concept, a preamble of a transmission frame is spread by an FSC as described above and transmitted. Such a structure will be described in detail in relation to FIG. 18. In other words, the filters of the transmitting unit 100 and the receiving unit 300 may be provided with the transmission filter and the reception filter according to a transmission scheme of a data field. Accordingly, for the spreading processed preamble, exposure to a distortion is unavoidable due to the transmission filter and the reception filter designed suitable for the data field.

In other words, it is assumed that a preamble transmission signal is transmitted in a waveform denoted by a dotted line in a case where the filters are not used. Then, the waveform of the reception preamble, which is finally processed by the transmission filter and reception filter and received, may be represented as a waveform denoted by a solid line. A bit stream received by a portion in which a distortion substantially occurs may be detected differently from a transmission bit stream. However, the above-described transmission filter and reception filter may be defined as parameters determined in a system and may provide consistent distortion characteristics for the preamble unit blocks A cell and B cell. Accordingly, the unit blocks A cell and B cell may be obtained as values passed through the transmission filter and reception filter through experiments or simulations. The unit blocks A cell and B cell provided to calculate correlation values in the frame synchronization unit 310 (see FIG. 7) are values obtained after the distortion characteristics of the transmission filter and reception filter are applied. Accordingly, the unit blocks A cell and B cell provided for calculating correlation values in the frame synchronization detecting unit 310 (see FIG. 7) may have different values from the unit blocks A cell and B cell used for generating a preamble in the transmitting unit 100.

Figure 17A:
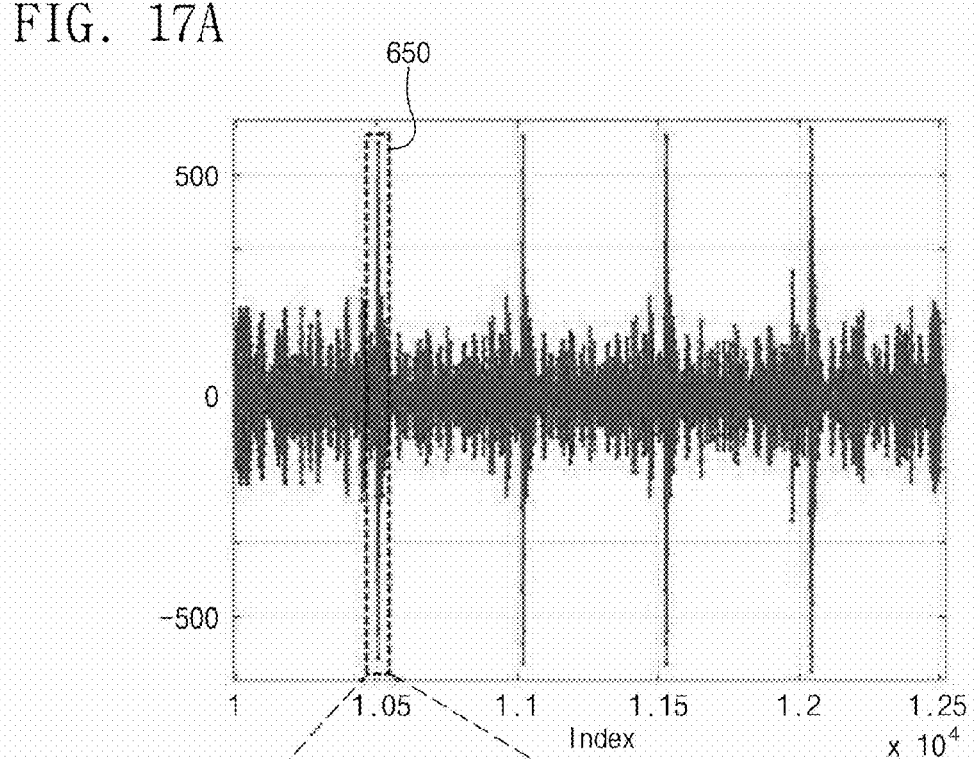
Figure 17A:
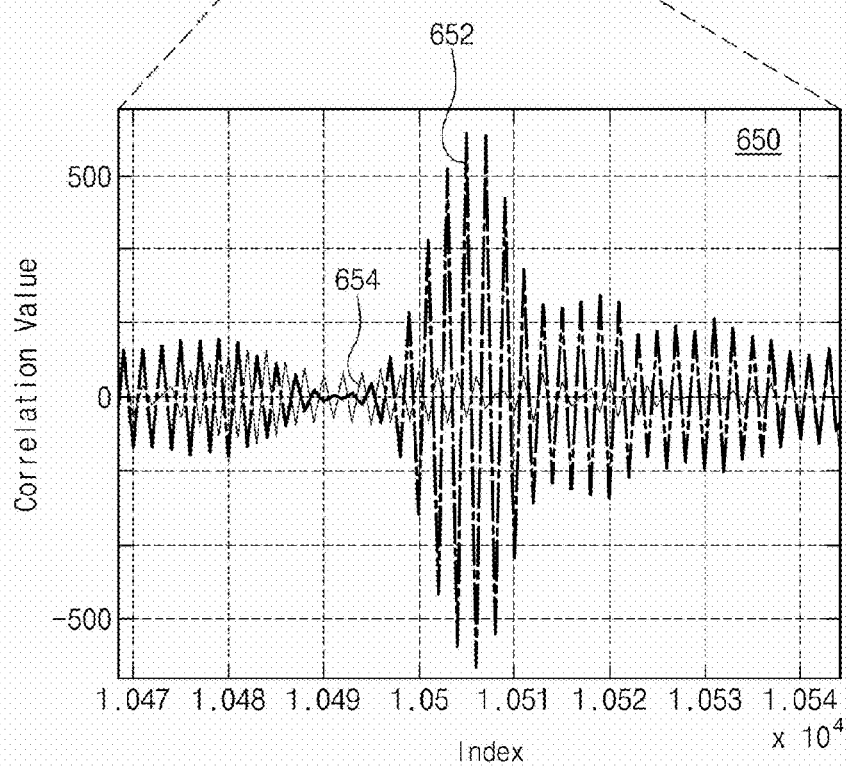

FIGS. 17A and 17B are views showing features of a transmission preamble and a reception preamble according to the inventive concept. FIG. 17A is a graph showing a correlation value of an unfiltered transmission preamble with a filtered reception preamble. FIG. 17B is a graph showing a correlation value of the filtered reception preamble with a reception preamble including a distortion by a filter.

Referring to FIG. 17A, a plurality of peaks detected around chip indices 10500, 11000, and 11500 are resulted from calculation of correlation values between unit block A cell without considering distortion and the reception preamble distorted by the transmission filter and reception filter. In addition, the peaks detected around the chip index 12000 are resulted from calculation of correlation values between a unit block B cell without considering distortion and the reception preamble.

When calculating correlation between the unit block A cell to which a distortion is not applied and the distorted reception preamble, correlation values 650 around the chip index 10501 may be specifically represented. From a correlation value distribution of the filtered reception preamble and the unit block A cell which does not include a signal distortion effect by the filter, a highest correlation value peak is require to occur at the chip index 10501. Here, it may be seen that there are peak values at similar levels in the correlation values 650 and asymmetrical characteristics are shown. Accordingly, it may not be easy to select the threshold value Q in a proper level. Such correlation value characteristics may occur identically in correlation values between the unit block B cell to which a distortion is not applied and the distorted reception preamble. It may not be easy either to apply the maximum likelihood detection scheme to find a maximum correlation value. Accordingly, the unit block used for calculating correlation values in the reception device 300 is required not to be a unit block used in the transmission device 100 but to be a unit block to which filtered and distorted information is applied.

Referring to FIG. 17B, a plurality of peaks detected around chip indices 10500, 11000, and 11500 are resulted from calculating correlation values between the unit block A cell to which distortions of the transmission filter and reception filter are applied and the reception preamble. In addition, the peaks detected around the chip index 12000 are resulted from calculation of correlation values between a unit block B cell in which the distortions are considered and the reception preamble.

When calculating correlation between the unit block A cell to which the distortions are applied and the distorted reception preamble, correlation values 660 around the chip index 10501 may be specifically represented. Here, a level of a maximum value is clearly shown in correlation values 660. From a correlation value distribution of the reception preamble, which has passed through the transmission and reception filters, and the unit block A cell including a signal distortion effect by a filter, it may be confirmed that a highest correlation value peak occurs at a chip index 10501 at which start positions of two preambles are the same. In other words, it may be well understood that it is easy to set the threshold value Q for detecting a peak and a precise peak position may be found when a maximum likelihood detection scheme is applied.

Figure 18:
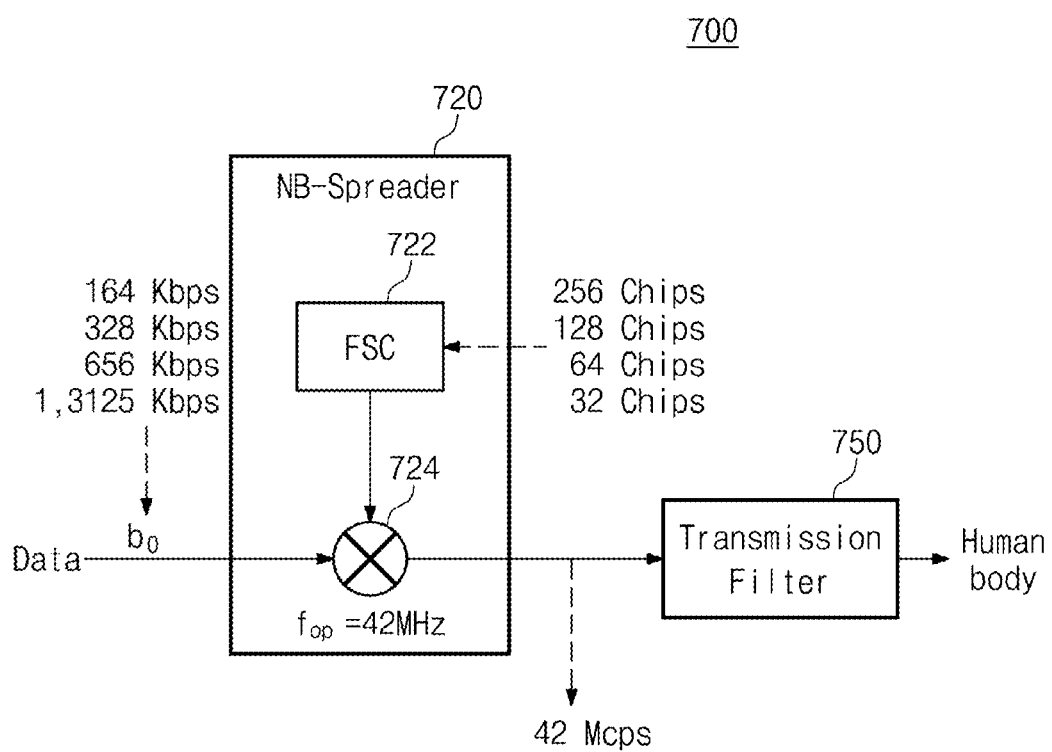
FIG. 18 is a block diagram schematically showing an exemplary data transmission device of the inventive concept.

FIG. 18 is a block diagram schematically showing an example of a data transmission device of the inventive concept. Referring to FIG. 18, a transmission device 700 according to an embodiment of the inventive concept may use an operating clock frequency fop of 42 MHz and provide a maximum transmission rate of 1.3125 Mbps. In other words, the transmission device 700 may include a narrow-band (NB)-spreader 720 and a transmission filter 750.

By the transmission device 700 of such a structure, data may be directly spread by an FSC 722 and a spreader 724 to be output without any specific processing. In addition, the output signal may pass the transmission filter 750 to be applied to a human body. At this point, under a transmission rate condition of 1.3125 Mbps, the length of a symbol code, namely, a code to which one bit data is mapped may be formed of 32 chips.

The above-described data transmission method will be called narrow band digital transmission (NBDT). A minimum Hamming distance between transmission symbols in a transmission device of an FSDT scheme corresponds to a half of the number of symbol chips. On the other hand, a minimum Hamming distance between transmission symbols in a NBDT scheme of the inventive concept is the same as the number of symbol chips. Under the same transmission rate condition, the length of the transmission symbol in the NBDT scheme corresponds to a quarter of the length of the transmission symbol in the FSDT scheme. However, under the same transmission rate condition, a minimum Hamming distance between transmission symbols in the NBDT scheme may be reduced by a half of, not by a quarter of, the symbol length in comparison to the FSDT scheme. In addition, when the transmission rate is 1.3125 Mbps, for example, two symbols in which each symbol set used for data transmission is formed of 32 chips per one information bit are used in the NBDT scheme. In addition, in an existing FSDT scheme, 16 symbol sets, each of which is formed of 128 chips per 4 information bits, are used by a serial-to-parallel (S2P) converter. Accordingly, the calculation length of the Hamming distance for detecting one information bit in a maximum likelihood decoder of a receiver may become 32 chips×2 symbols=64 in the NBDT scheme, and 128 chips×16 symbols/4 bits=512 in the FSDT scheme. Accordingly, in the NBDT scheme, a decoding and detection complexity may be lowered by 12.5% in comparison to the FSDT scheme.

Figure 19:
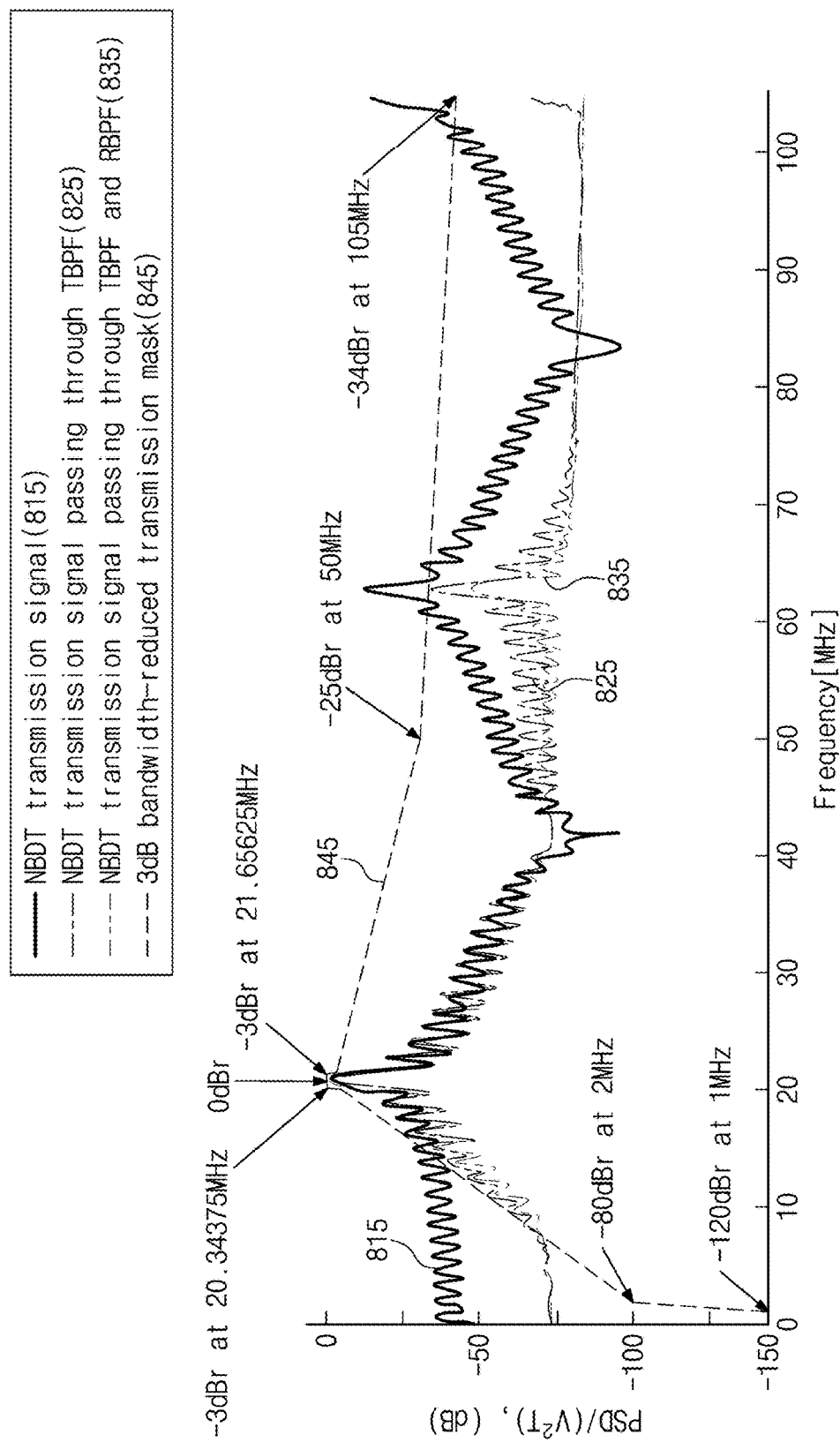
FIG. 19 is a view showing a power spectrum density (PSD) for a signal in a narrowband digital transmission (NBDT) scheme, when a filter for satisfying a transmission mask is applied according to an embodiment of the inventive concept.

FIG. 19 is a view showing a power spectrum density (PSD) for a signal in the NBDT scheme, when a filter for satisfying a transmission mask according to an embodiment of the inventive concept is applied. Here, the transmission rate is assumed to be 1.3125 Mbps.

FIG. 19 illustrates spectrums 815, 825, and 835, and a transmission mask of which 3 dB band is reduced from a transmission mask 845 presented in standards. Here, the 3 dB band of the transmission mask for the FSDT scheme presented in existing standards may be defined as 5.25 MHz (namely, 18.375 MHz to 23.625 MHz) and the 3 dB band of the transmission mask 845 in the NBDT scheme may be defined as about 1.3125 MHz (20.34375 MHz to 21.65625 MHz). The spectrum 815 is a spectrum of a transmission signal in the NBDT scheme and shows a power spectrum density for a case where filtering is not applied. The spectrum 825 represents a transmission signal passing through a transmission filter (TBPF) in the NBDT scheme. The spectrum 835 represents a transmission signal passing through a transmission filter (TBPF) and a reception filter (RBPF) in the NBDT scheme.

Hereinbefore, the power spectrum densities have been illustrated at various operations for each transmission signal in the NBDT scheme. For the transmission filter TBPF for filtering each transmission signal in the NBDT scheme, parameters are required to be defined to be matched with the transmission mask 845 in order to minimize a distortion of the transmission signal. As illustrated, it may be seen that the 3 dB band (1.3125 MHz) of the transmission mask 845 in the NBDT scheme corresponds to a quarter of the 3 dB band (5.25 MHz) in the FSDT scheme. Accordingly, it may be seen on the basis of the 3 dB band that a spectral efficiency in the NBDT scheme is improved four times in comparison to the FSDT scheme. In other words, it may be confirmed that the NBDT scheme uses a frequency band in which 1.3125 MHz is transmitted to achieve the spectral efficiency of 1 bps/Hz.

According to a transmission/reception device of a human body communication system and a preamble processing method according to an embodiment of the inventive concept, it is possible to achieve a maximum spectral efficiency, for example, 1 bps/Hz of a transmission/reception signal on the basis of a 3 dB bandwidth. In addition, it is possible to provide detection performance suitable for a preamble through a preamble structure and a synchronization detecting algorithm according to embodiments of the inventive concept.

Furthermore, it is also possible to minimize implementation complexity and to dramatically improve signal detecting performance using data transmission/reception method for human body communication according to embodiments of the inventive concept.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method for wireless communication in a human body network, the method comprising:
   generating a preamble of a transmission signal by:
      adjusting a length of a frequency shift code (FSC) according to an operating clock frequency or a transmission rate and a first pseudo random binary sequence (PRBS) code of p chips where p is a natural number;
      generating a first preamble unit block of n chips where n is a natural number using the FSC;
      generating a second preamble unit block of n' chips using the FSC and a second PRBS code of p' chips; and
      arraying the first preamble unit block consecutively and repeatedly and disposing the second preamble unit block at a next stage to form the preamble of the transmission signal, and
   transmitting the transmission signal that includes the preamble over the human body network.

2. The method of claim 1, wherein the first PRBS code or the second PRBS code comprises a Gold code, M-sequence, or a Walsh code.

3. The method of claim 1, wherein the first PRBS code corresponds to a code value between a first chip and a p-th chip of the PRBS code of 2p chips, and the second PRBS code corresponds to a code value between a (p+1)-th chip and 2p-th chip of the PRBS code.

4. The method of claim 1, wherein the FSC is a code in which a logic '1' and a logic '0' are alternately repeated.

5. The method of claim 1, wherein a length of the first preamble unit block and a length of the second preamble unit block have different values (n≠n').

6. The method of claim 5, wherein the length of the FSC corresponds to a value obtained by dividing the length of the first preamble unit block by a length of the first PRBS code.

7. The method of claim 1, wherein the first PRBS code and the second PRBS code are generated from different generation polynomials.

8. The method of claim 1, wherein the operating clock frequency corresponds to 42 MHz according to IEEE 802.15.6 (WBAN) standards.

9. A frame synchronization method in a reception device for human body communication, the frame synchronization method comprising:
   receiving a frame comprising a preamble comprising a first preamble unit block and a second preamble unit block that are generated using a FSC of which a length is adjusted according to an operating clock frequency or a transmission rate and different pseudo noise codes;
   calculating a plurality of first correlation values between a third preamble unit block obtained by applying a distortion of a transmission filter or a reception filter to the first preamble unit block and the frame, and detecting whether the plurality of first correlation values exceeds a pre-determined threshold value a reference number of times at a reference period;
   when the first correlation values exceed the pre-determined threshold value the reference number of times, calculating, in a prescribed chip period, a plurality of second correlation values between a fourth preamble unit block obtained by applying the distortion of the transmission filter or the reception filter to the second preamble unit block and the frame;
   determining a position of a chip corresponding to a maximum value from among the plurality of second correlation values; and
   determining a position of a start chip of the frame with reference to the chip position corresponding to the maximum value and lengths of the first preamble unit block and the second preamble unit block.

10. The frame synchronization method of claim 9, wherein when it is detected that the threshold value is exceeded at least twice by the plurality of the first correlation values in an interval of the length of the first preamble unit block, moving to the calculating of the plurality of second correlation values in the prescribed chip period.

11. The frame synchronization method of claim 10, wherein when it is detected that the threshold value is exceeded less than twice by the plurality of the first correlation values in an interval of the length of the first preamble unit block, the preamble is not determined to be received.

12. The frame synchronization method of claim 9, wherein the first preamble unit block and the second preamble unit block have an identical length.

13. The frame synchronization method of claim 9, wherein the chip position corresponding to the maximum value from among the plurality of second correlation values is detected with a maximum likelihood scheme.

14. A transmission device for human body communication comprising:
   a preamble generator configured to use an FSC of which a length is adjusted according to an operating clock frequency or a transmission rate and a first PRBS code of p chips to generate a first preamble unit block of n chips, use the FSC and a second PRBS code of p chips to generate a second preamble unit block of n chips, and to array a plurality of the first preamble unit blocks and the second preamble unit block to form a preamble;
   a data generator configured to receive data and spread the data with the FSC to generate transmission data; and
   a multiplexer configured to couple the preamble and the transmission data to output as a transmission signal.

15. The transmission device of claim 14, wherein a length of the FSC is determined under conditions that a value obtained by multiplying the operating clock frequency by a length of the data is divided by the FSC length and the value satisfies a pre-determined bandwidth.

16. The transmission device of claim 14, wherein the data generator generates the transmission data without a serial-to-parallel converting circuit.

17. The transmission device of claim 14, further comprising:
   a transmission filter configured to filter the transmission signal to output the filtered signal such that transmission mask characteristics for the transmission data are satisfied.

18. The transmission device of claim 14, wherein the data generator comprises a narrow band spreader configured to directly spread the data provided in serial to the FSC to output as the transmission signal.

19. The transmission device of claim 18, wherein the data and the FSC are XOR-ed to be output as the transmission signal.

20. The transmission device of claim 14, wherein the transmission filter comprises a filter parameter according to transmission mask characteristics of IEEE 802.15.6 (WBAN) standards.

* * * * *